US010209516B2

(12) United States Patent
Yamamoto et al.

(10) Patent No.: US 10,209,516 B2
(45) Date of Patent: *Feb. 19, 2019

(54) DISPLAY CONTROL METHOD FOR PRIORITIZING INFORMATION

(71) Applicant: SONY CORPORATION, Tokyo (JP)

(72) Inventors: Kazuyuki Yamamoto, Kanagawa (JP); Takuro Noda, Tokyo (JP); Tetsuyuki Miyawaki, Kanagawa (JP); Kenji Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/598,547

(22) Filed: May 18, 2017

(65) Prior Publication Data

US 2017/0255010 A1 Sep. 7, 2017

Related U.S. Application Data

(63) Continuation of application No. 14/407,722, filed as application No. PCT/JP2013/004916 on Aug. 20, 2013, now Pat. No. 9,678,342.

(30) Foreign Application Priority Data

Oct. 1, 2012 (JP) .................................. 2012-219450

(51) Int. Cl.
*G02B 27/01* (2006.01)
*H04M 1/725* (2006.01)
(Continued)

(52) U.S. Cl.
CPC ......... *G02B 27/017* (2013.01); *G06F 3/0346* (2013.01); *G06K 9/0061* (2013.01); *H04M 1/72563* (2013.01); *H04M 1/72572* (2013.01); *H04M 1/72586* (2013.01); *G02B 2027/0178* (2013.01); *H04M 2250/12* (2013.01)

(58) Field of Classification Search
CPC .... G06F 1/1626; G06F 1/1694; G06F 3/0346; G06F 3/0418; G06F 3/0482; G06F 2200/1637; G06F 3/0488; G06F 1/163; G06F 3/005; G06F 3/011; G06F 3/013; G06F 3/017; G06F 3/046; H04M 1/72544; H04M 1/72563; H04M 1/72572; H04M 1/72586; H04M 2250/12; G02B 27/0093;
(Continued)

(56) References Cited

U.S. PATENT DOCUMENTS 6,100,889 A * 8/2000 Sciammarella ....... G06F 3/0482
715/815
2006/0086022 A1* 4/2006 Would .................. G06F 3/0482
40/584

(Continued)

OTHER PUBLICATIONS

Notice of Allowance and Fees Due (PTOL-85) for U.S. Appl. No. 14/407,722, dated Feb. 16, 2017, 9 pages.

(Continued)

*Primary Examiner* — Robert J Michaud
(74) *Attorney, Agent, or Firm* — Chip Law Group

(57) ABSTRACT

An apparatus includes a user action state obtaining circuit configured to obtain an action state of a user; and a display control circuit configured to control a display to modify display information based on the action state.

21 Claims, 19 Drawing Sheets

(51) Int. Cl.
*G06F 3/0346* (2013.01)
*G06K 9/00* (2006.01)

(58) Field of Classification Search
CPC .......... G02B 27/017; G02B 2027/0178; G06K 9/00; G06K 9/0061
See application file for complete search history.

(56) References Cited

U.S. PATENT DOCUMENTS

| | | | |
|---|---|---|---|
| 2006/0110008 A1 | 5/2006 | Vertegaal et al. | |
| 2008/0125173 A1* | 5/2008 | Chen | G06F 3/0482 455/557 |
| 2009/0100384 A1* | 4/2009 | Louch | G06F 1/1626 715/863 |
| 2012/0084053 A1* | 4/2012 | Yuen | A61B 5/0002 702/160 |
| 2012/0194551 A1* | 8/2012 | Osterhout | G02B 27/0093 345/633 |
| 2012/0290401 A1* | 11/2012 | Neven | A61B 3/113 705/14.68 |

OTHER PUBLICATIONS

Final Rejection for U.S. Appl. No. 14/407,722, dated Oct. 6, 2016, 32 pages.
Non-Final Rejection for U.S. Appl. No. 14/407,722, dated Apr. 8, 2016, 24 pages.

* cited by examiner

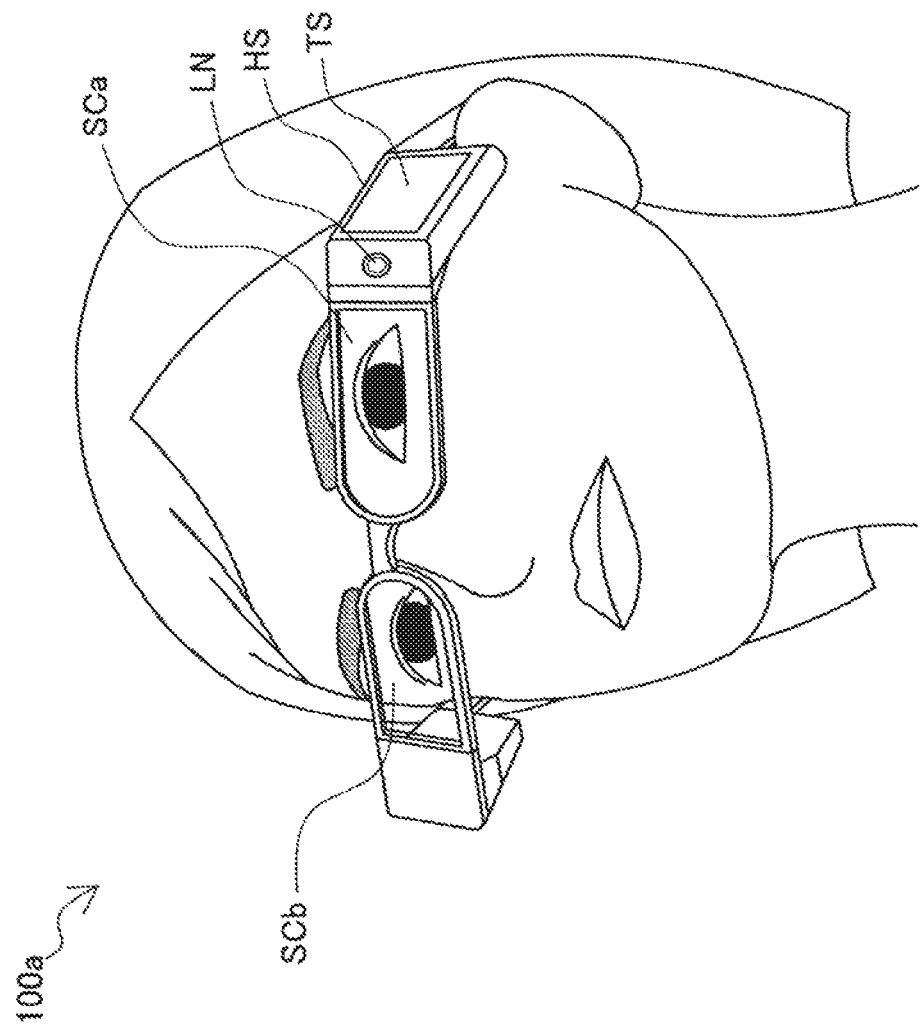

[Fig. 2]
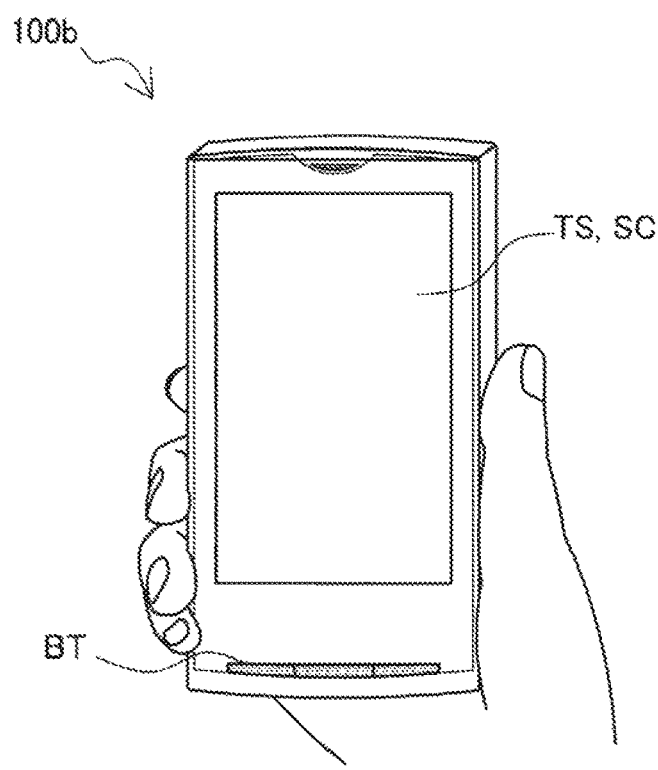
[Fig. 3]
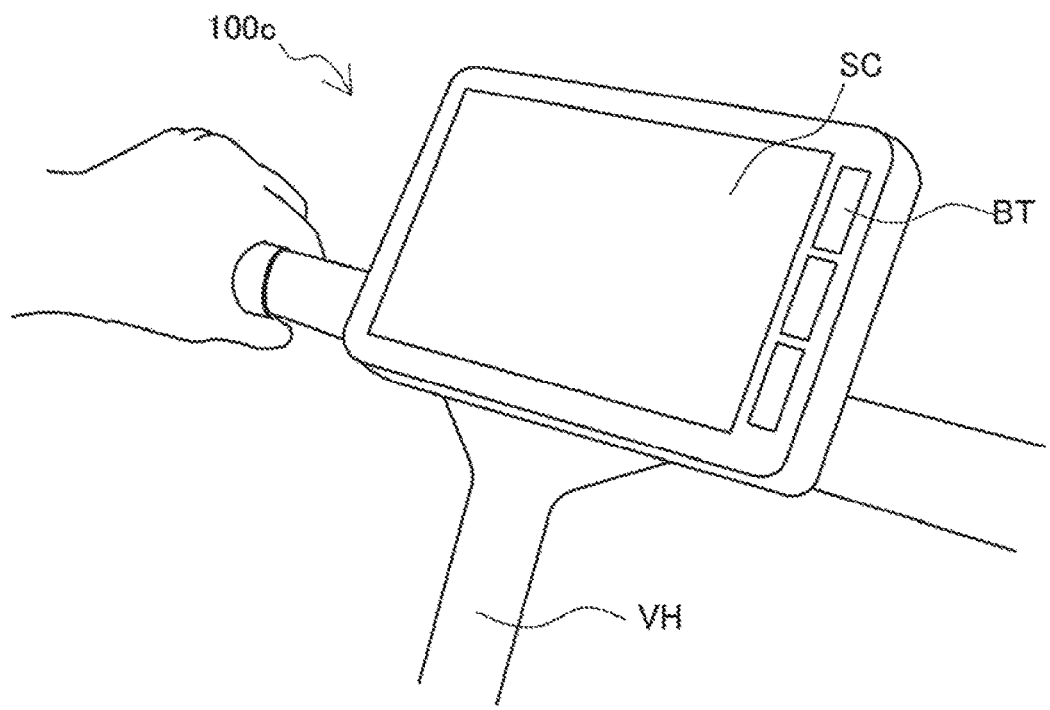

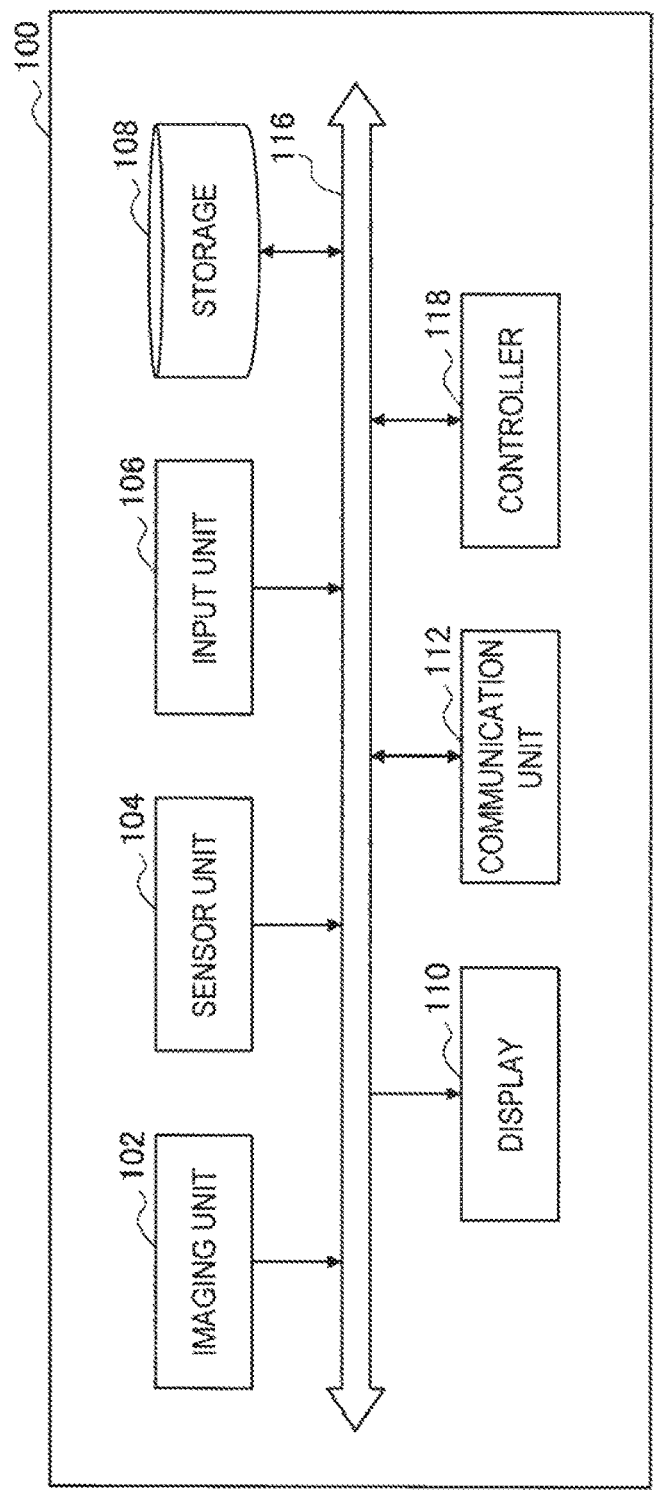
[Fig. 4]

[Fig. 5]
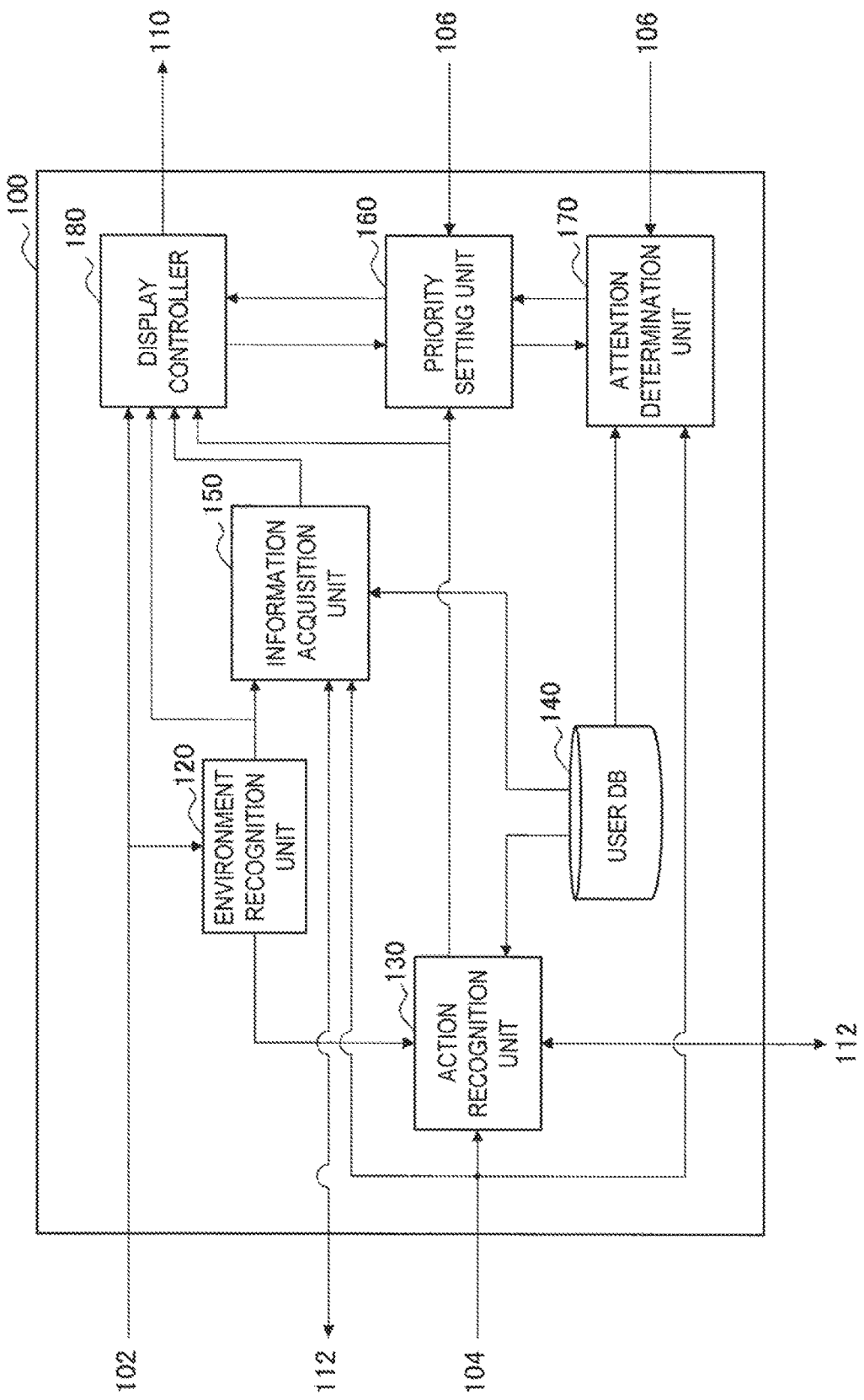

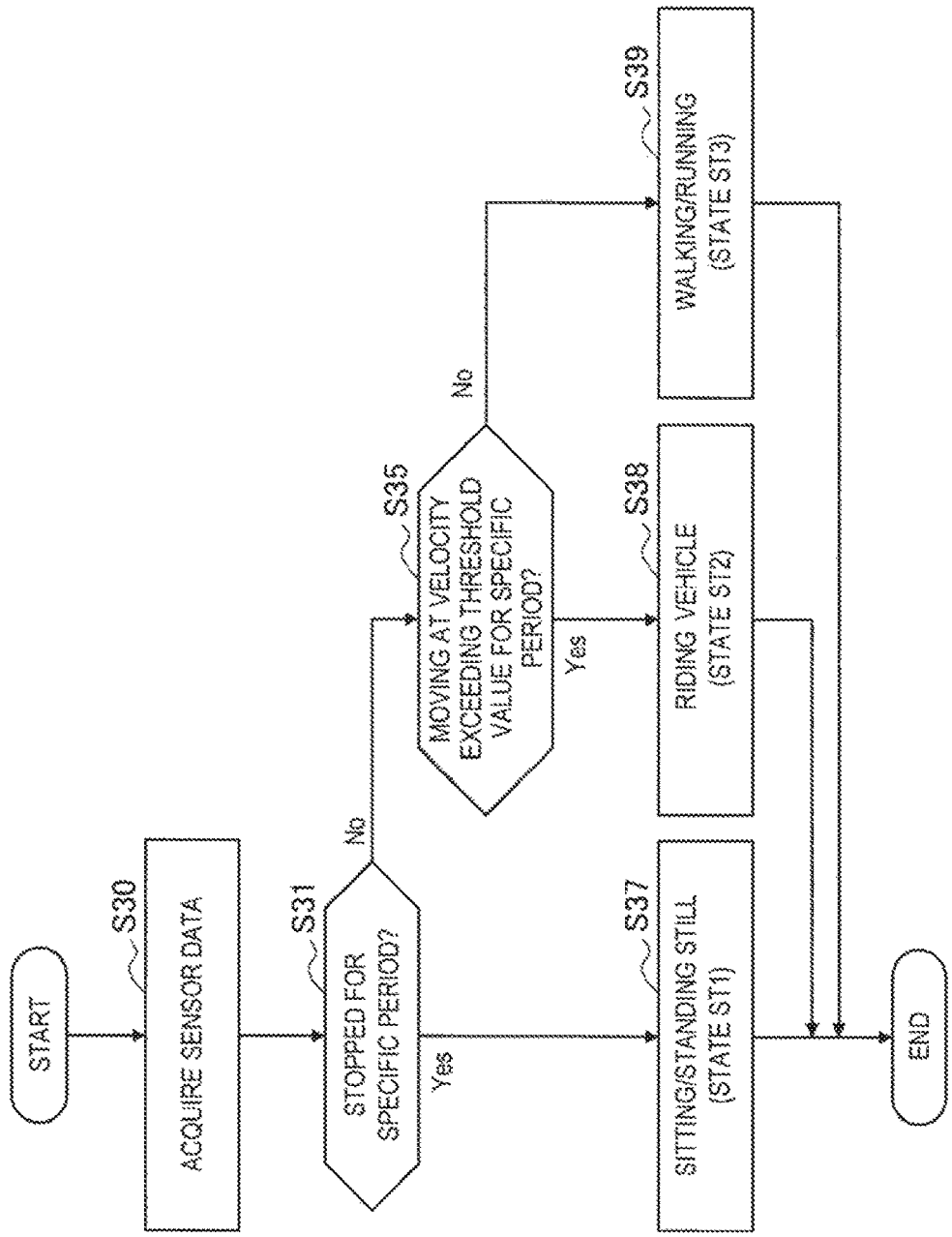
[Fig. 6A]

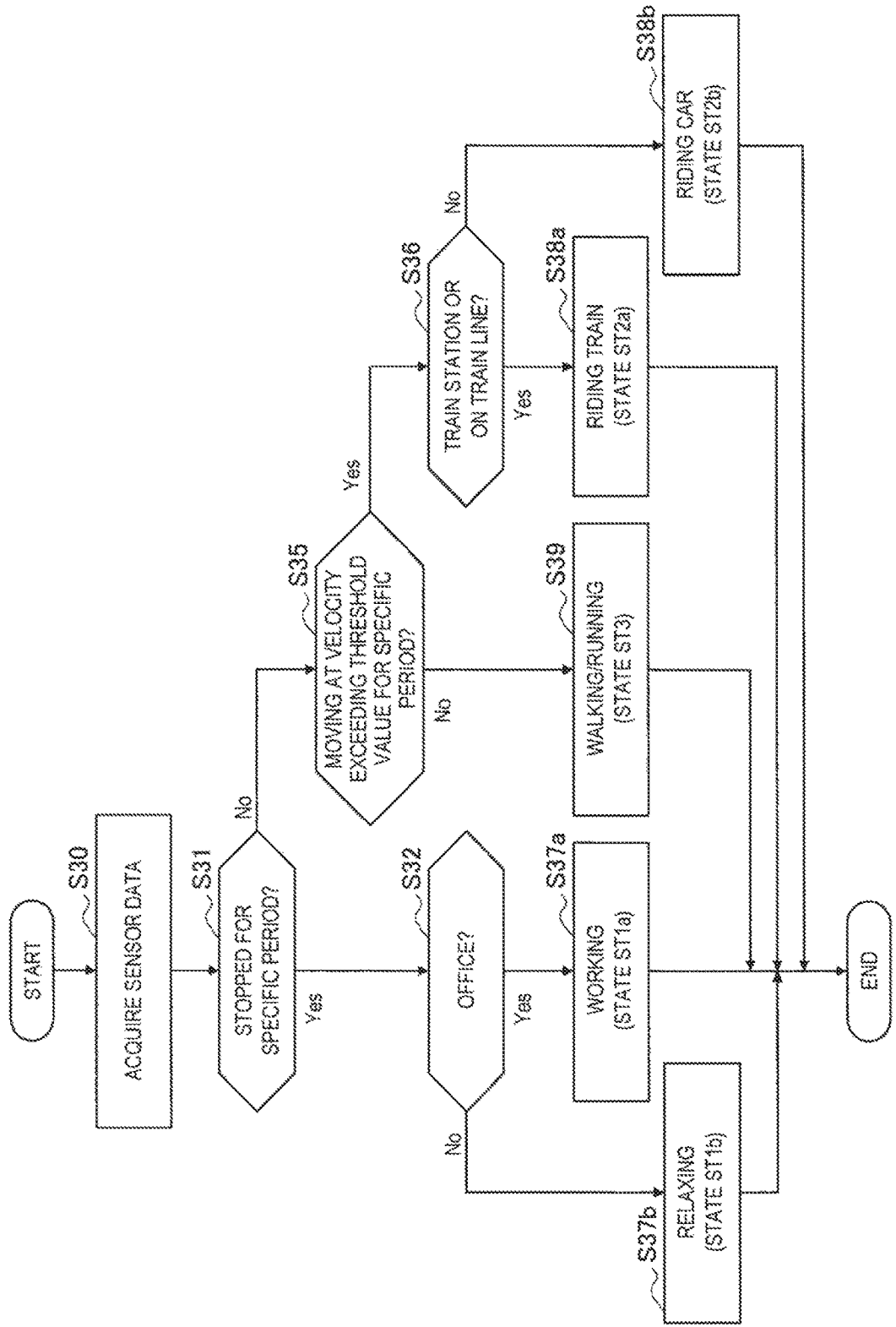

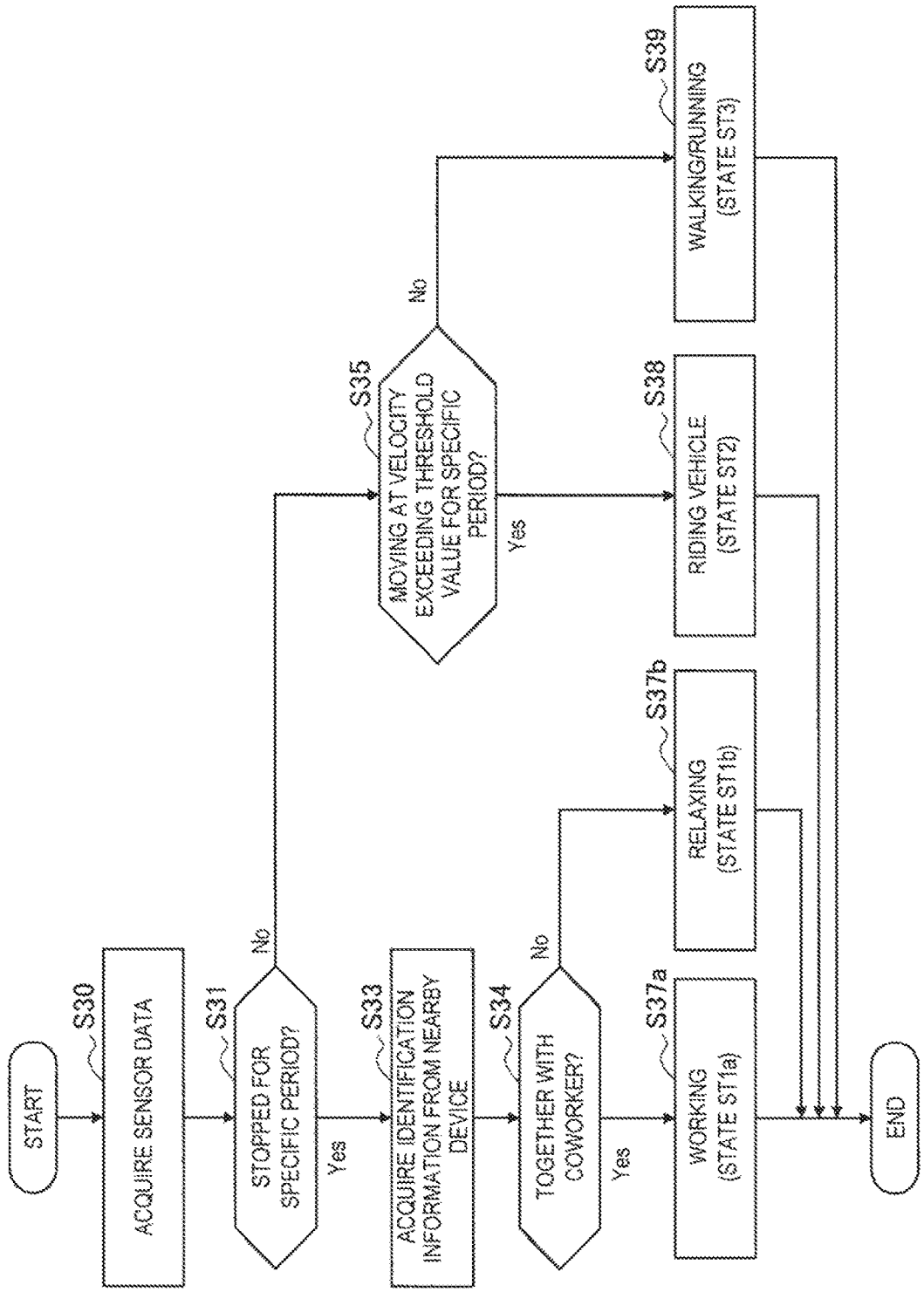

[Fig. 7]
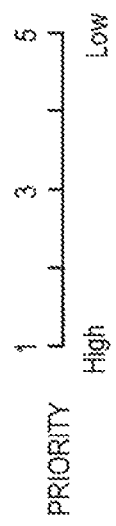
| CATEGORY | PRIORITY | | |
| --- | --- | --- | --- |
| | ST1 | ST2 | ST3 |
| ADVERTISING INFORMATION | 3 | 5 | 3 |
| SOCIAL INFORMATION | 1 | 3 | 5 |
| NEWS INFORMATION | 1 | 3 | 5 |
| TRAFFIC INFORMATION | 5 | 1 | 1 |
PRIORITY
High 1  3  5 Low

[Fig. 8]

| CATEGORY | SUB-CATEGORY | PRIORITY | | | | |
|---|---|---|---|---|---|---|
| | | ST1a | ST1b | ST2a | ST2b | ST3 |
| ADVERTISING INFORMATION | MUSIC ADVERTISING | 3 | 3 | 3 | 5 | 5 |
| | ... | 5 | 1 | ... | ... | ... |
| SOCIAL INFORMATION | SHORT POST | ... | ... | 3 | 5 | 3 |
| | ... | 1 | 3 | ... | ... | ... |
| NEWS INFORMATION | ECONOMIC NEWS | ... | 3 | 3 | 3 | 3 |
| | ... | 3 | ... | ... | ... | ... |
| TRAFFIC INFORMATION | TRAIN SCHEDULE INFORMATION | 5 | 5 | 1 | 5 | 3 |
| | NAVIGATION INFORMATION | ... | ... | 5 | 1 | ... |

PRIORITY  1 — 3 — 5
High         Low

[Fig. 9A]

| CATEGORY | BASE PRIORITY | ITEM ID | COTENT | ADJUSTED PRIORITY |
|---|---|---|---|---|
| ... | ... | ... | ... | ... |
| SOCIAL INFORMATION | 3 | IT11 | I bought a new camera ... | 2 |
|  |  | IT12 | I'm drinking at ... | 3 |
|  |  | IT13 | We've got a baby ... | 3 |
| NEWS INFORMATION | 3 | ... | ... | ... |
|  |  | IT21 | Recession affected car industry ... | 2 |
|  |  | IT22 | The president visited ... | 3 |
| ... | ... | ... | ... | ... |

<Key Word> /142
- car
- camera
...

HIGHER ATTENTION → IT11 (camera)
HIGHER ATTENTION → IT21 (car)

[Fig. 9B]
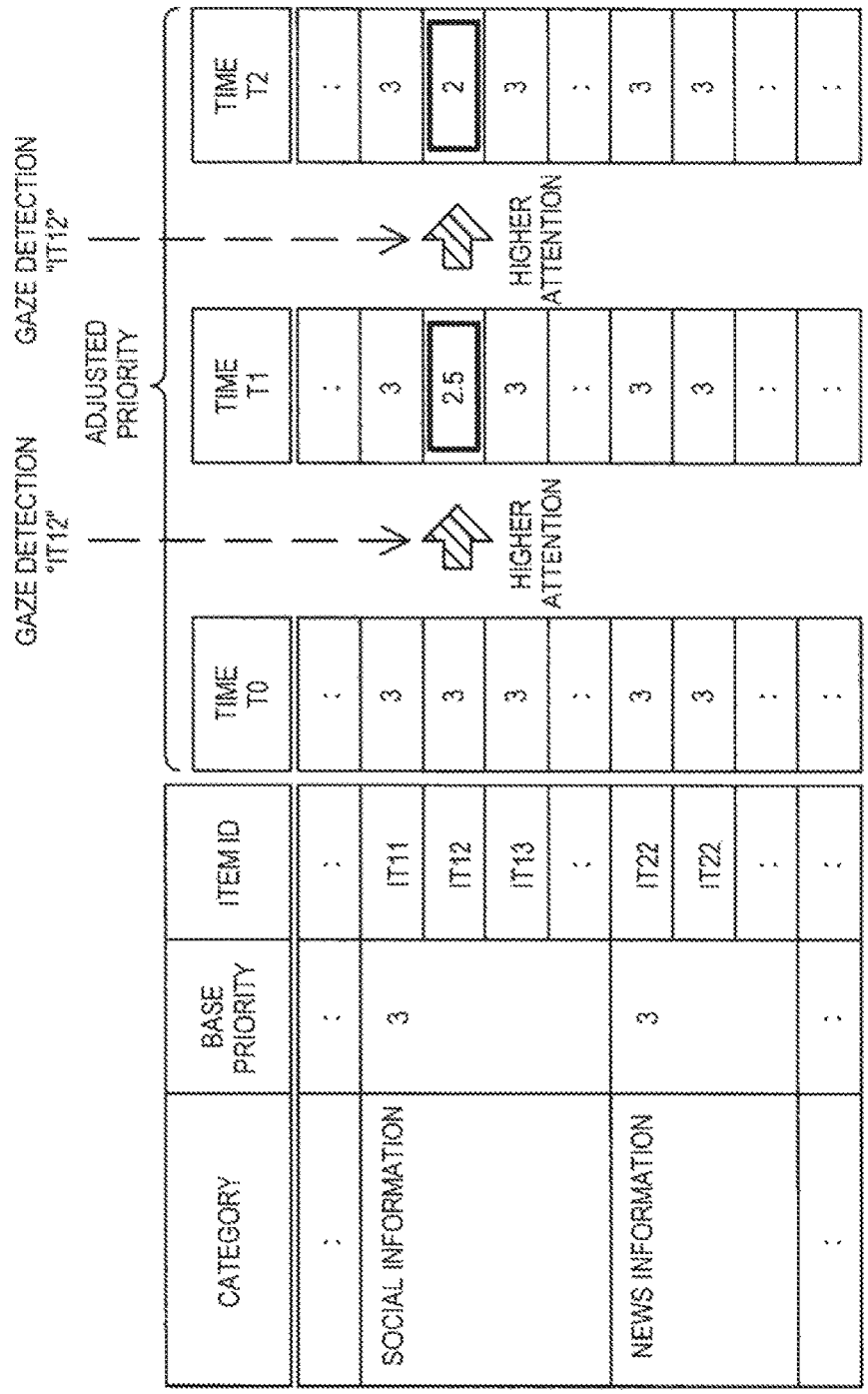

[Fig. 10]
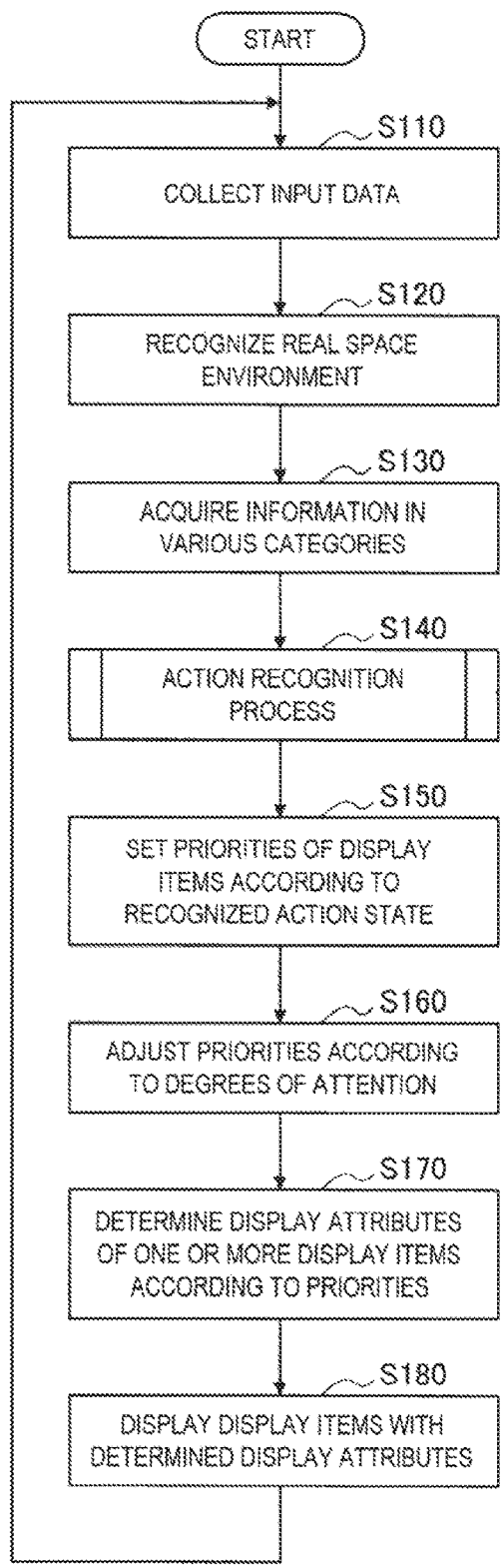

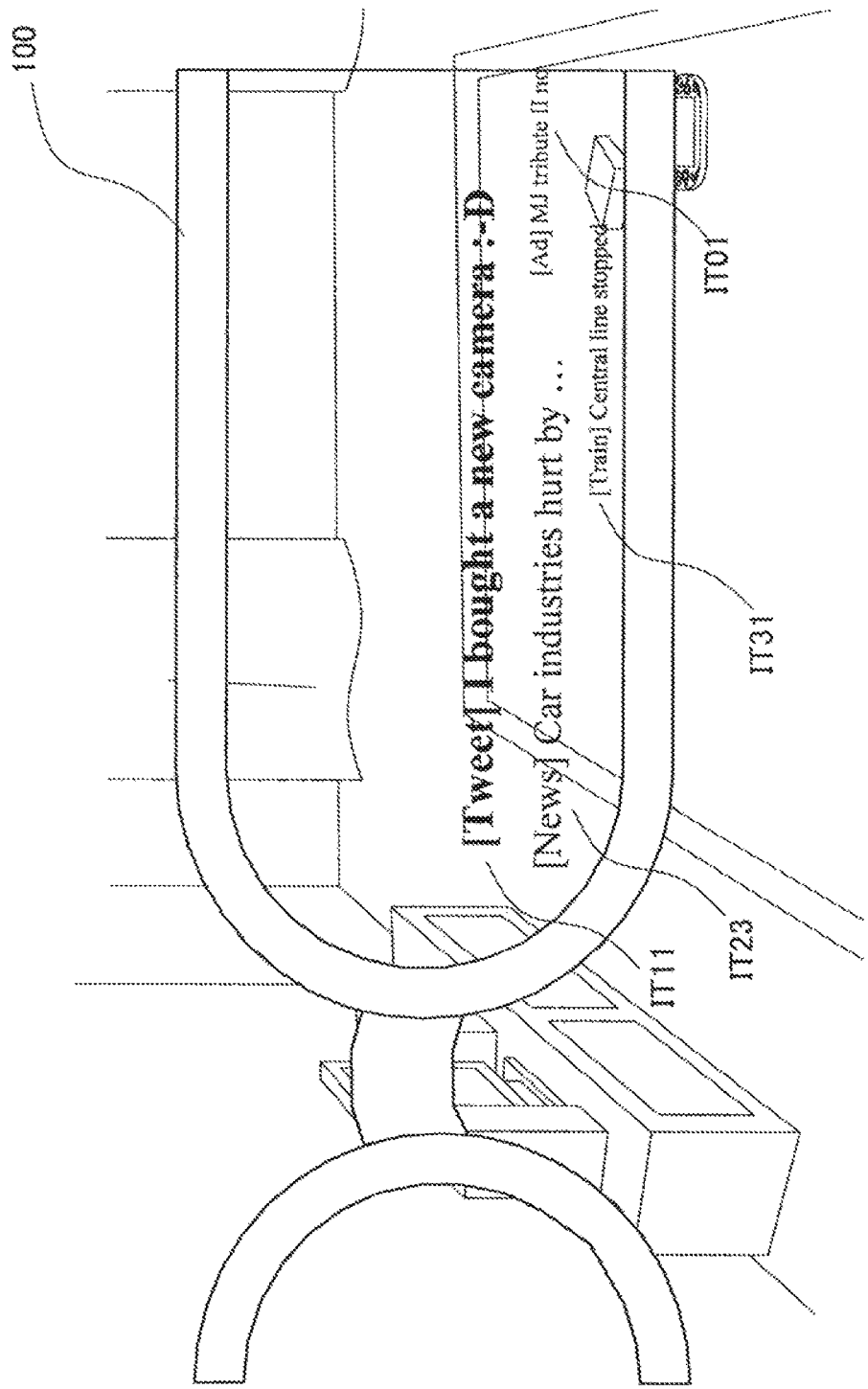

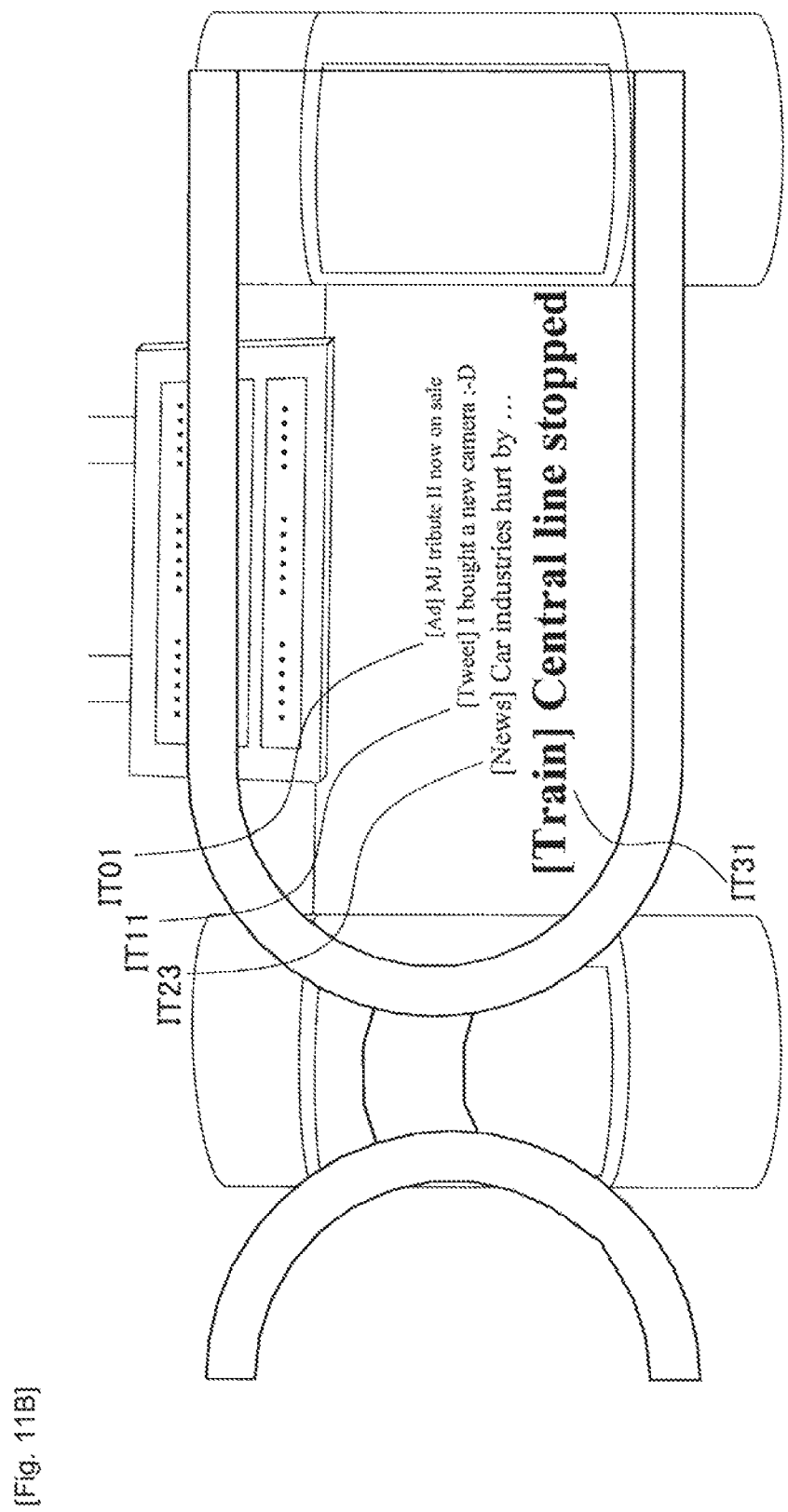

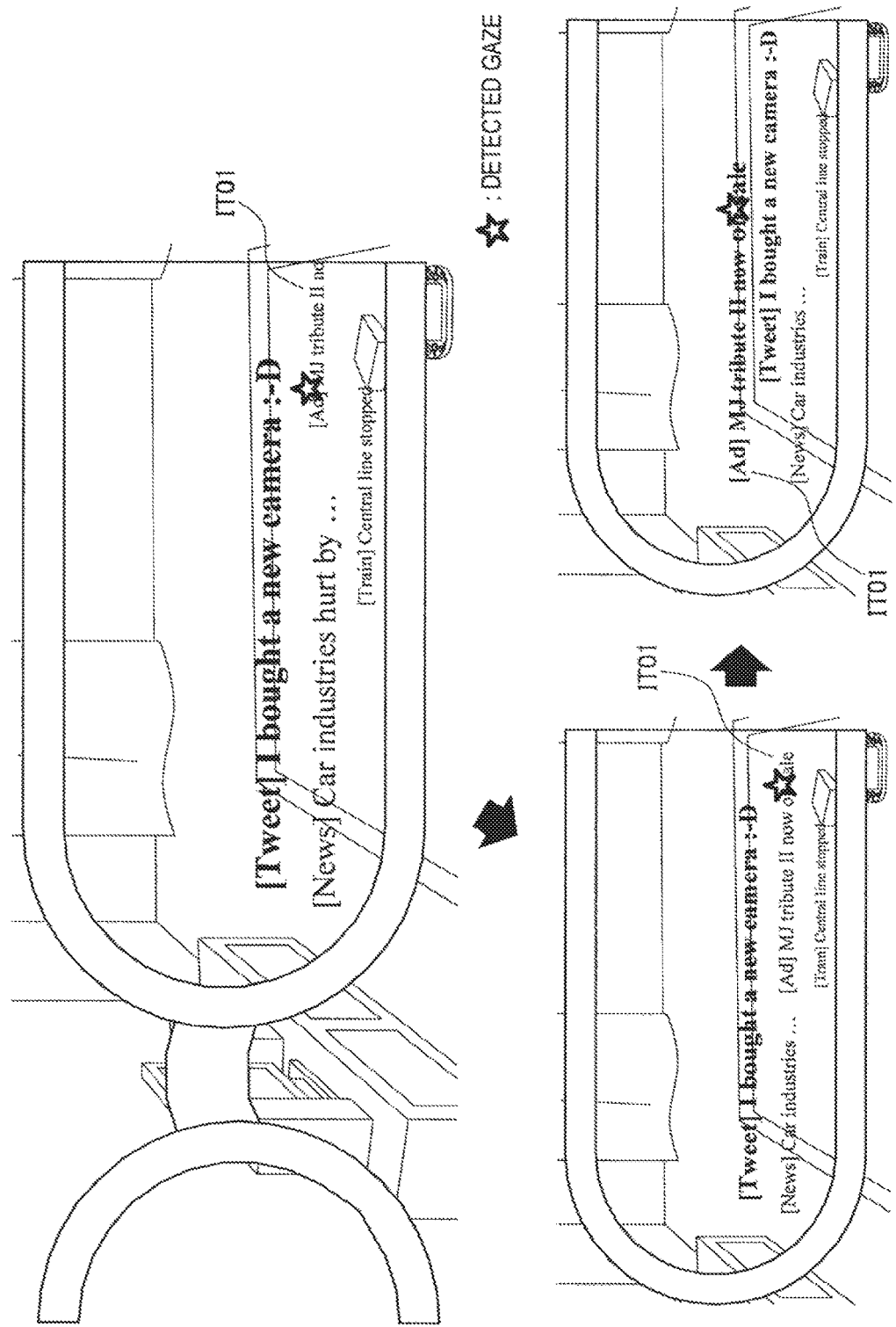

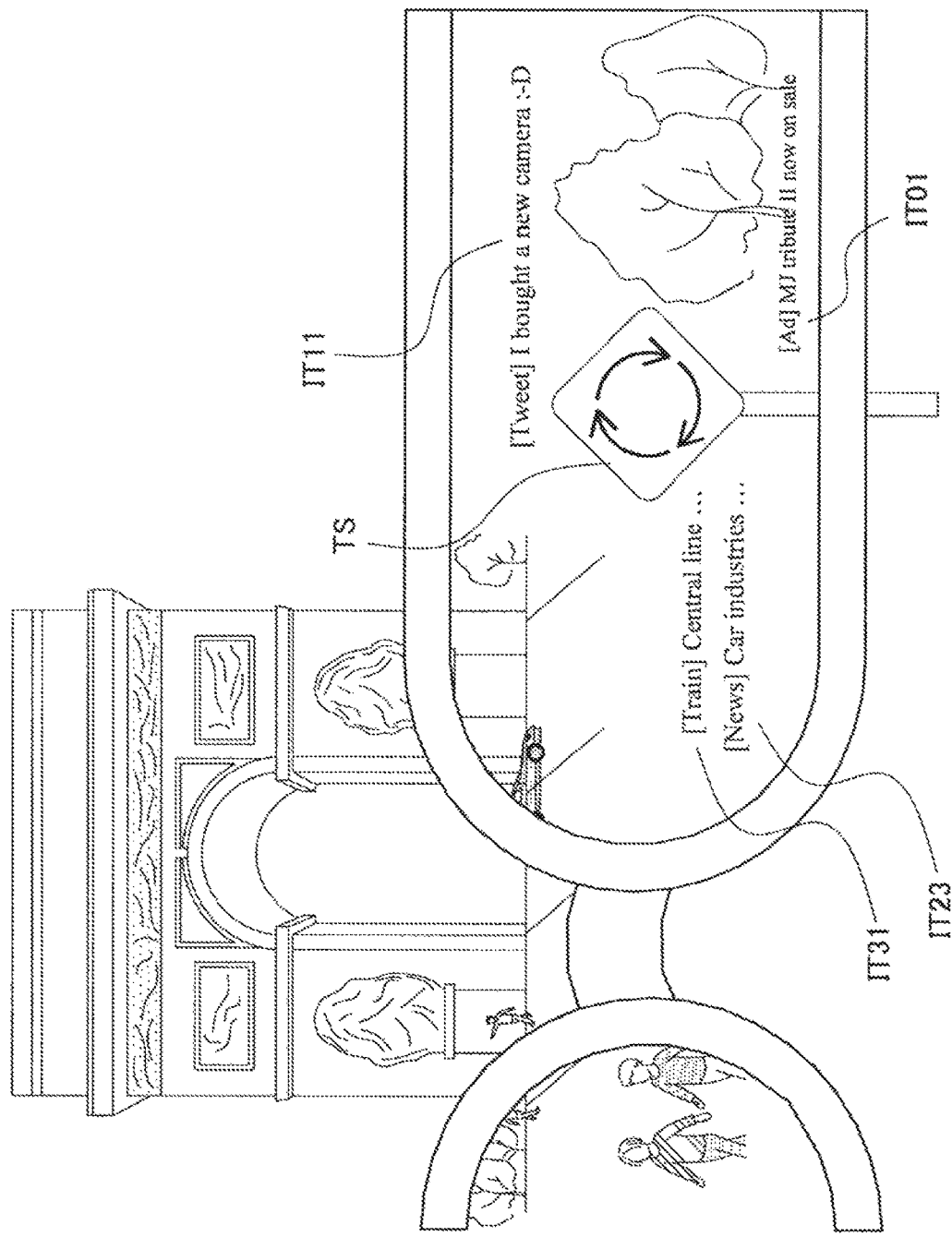

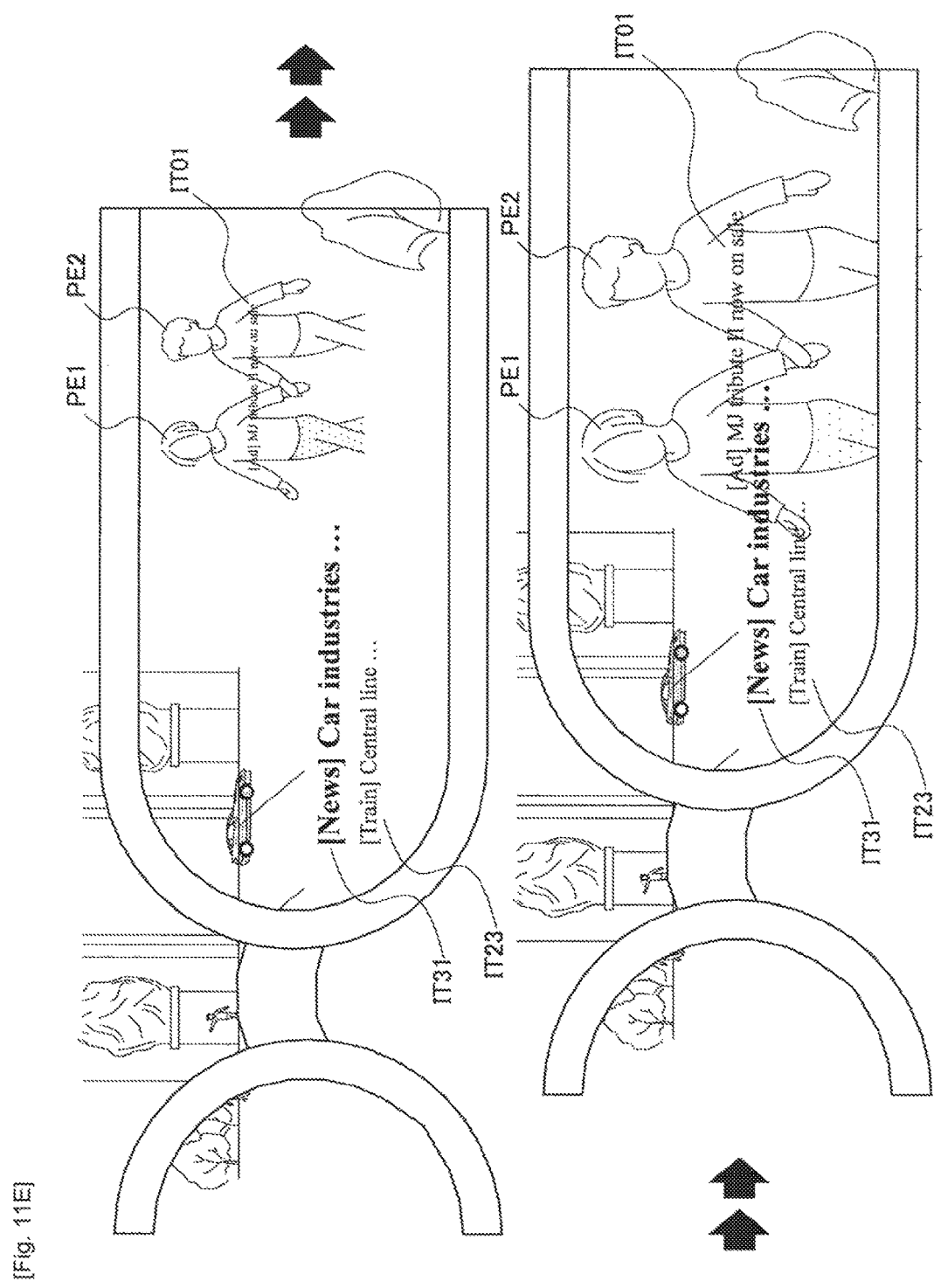

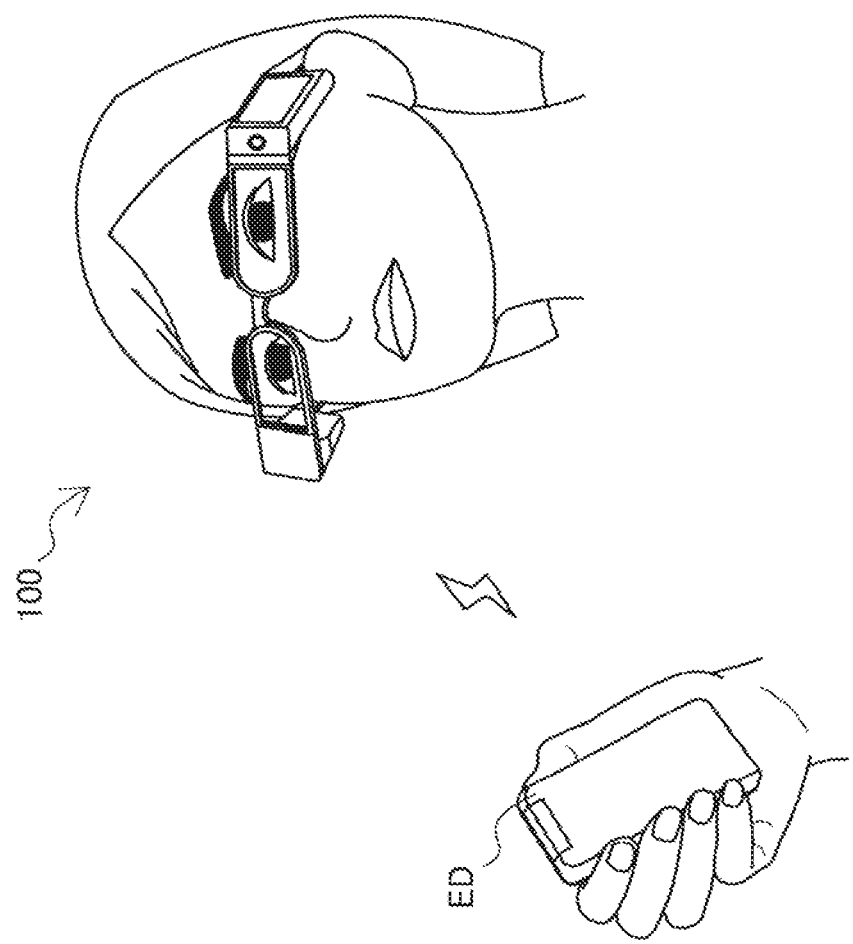
[Fig. 12]

[Fig. 13]
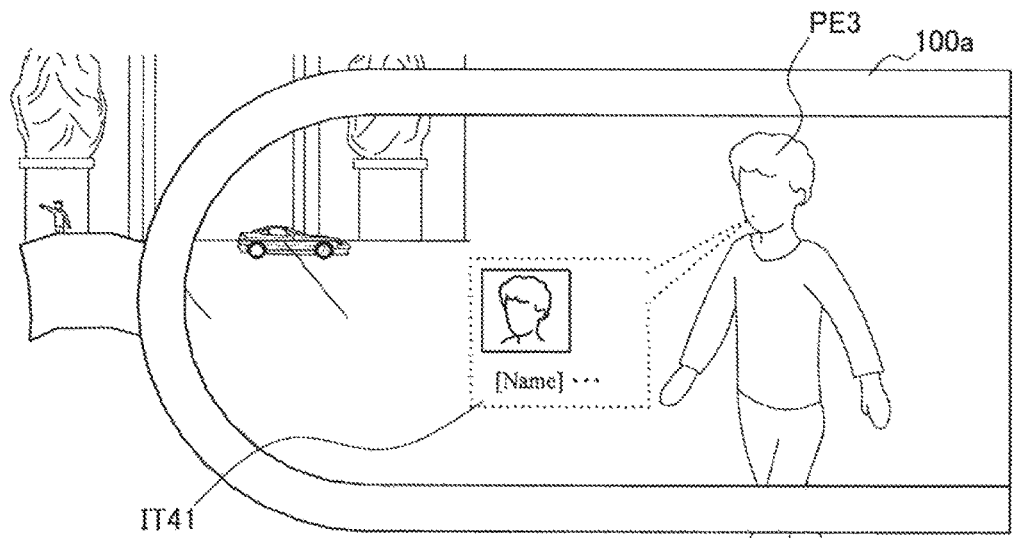
[Fig. 14]
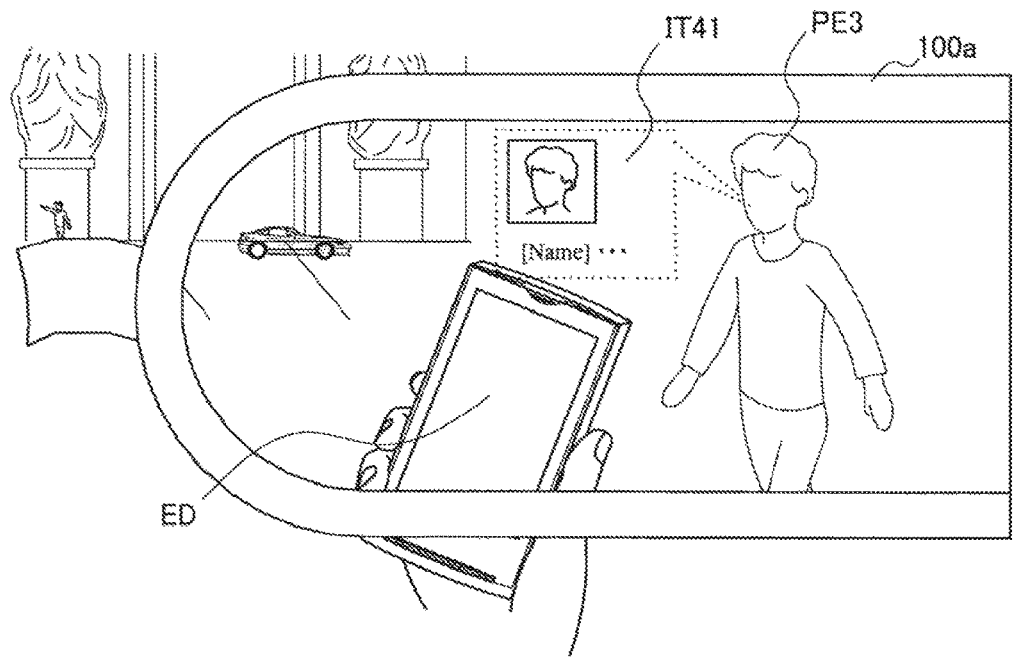

DISPLAY CONTROL METHOD FOR PRIORITIZING INFORMATION

CROSS REFERENCE TO RELATED APPLICATIONS

The present application is a continuation application of U.S. patent application Ser. No. 14/407,722 filed Dec. 12, 2014, which is a national stage entry of PCT application PCT/JP2013/004916 filed Aug. 20, 2013 and which claims the benefit of Japanese Priority Patent Application 2012-219450 filed Oct. 1, 2012, the entire contents of which are incorporated herein by reference.

TECHNICAL FIELD

The present disclosure relates to an information processing device, a display control method, and a program encoded on a non-transitory computer readable medium.

The present disclosure contains subject matter related to that disclosed in Japanese Priority Patent Application JP 2012-219450 filed in the Japan Patent Office on Oct. 1, 2012, the entire content of which is hereby incorporated by reference.

BACKGROUND ART

Recently, users are spending more time viewing information provided by information devices as a result of great improvements in information device portability. For example, a user acquires information from a smartphone while commuting to work or school. A navigation device provides information to a user who is driving a car or riding a bicycle. A wearable device such as a head-mounted display (HMD) is able to provide information to a user even while the user is performing any given activity. For example, PTL 1 below proposes displaying different information on a screen of a wearable device depending on outside conditions, in order to provide the user with information that is contextually appropriate or interesting. The outside conditions herein may include factors such as the environmental light level, temperature, humidity and barometric pressure, the distance to a photographic subject, whether or not a photographic subject is a living thing, as well as the current location and date/time.

CITATION LIST

Patent Literature

[PTL 1]
JP 2008-83290A

SUMMARY

Technical Problem

The types of information provided to users from day to day cover a wide range. However, if much information is simultaneously provided to a user, there is a risk that the user will instead overlook highly necessary information. Particularly, it is difficult for a user to check a varied assortment of information one by one in the case of attempting to provide information while a user is engaged in some activity. Thus, it is desirable to provide information in a format enabling the user to reliably notice information that matches the activity.

Solution to Problem

The present invention broadly comprises an apparatus, method and a non-transitory computer readable medium encoded with a program for performing the method. In one embodiment, the apparatus includes a user action state obtaining circuit configured to obtain an action state of a user; and a display control circuit configured to control a display to modify display information based on the action state.

Advantageous Effects of Invention

According to technology in accordance with the present disclosure, it is possible to reduce the risk of a user overlooking highly necessary information while the user is engaged in some activity.

BRIEF DESCRIPTION OF DRAWINGS

FIG. 1 is an explanatory diagram illustrating a first example of the exterior of an information processing device.

FIG. 2 is an explanatory diagram illustrating a second example of the exterior of an information processing device.

FIG. 3 is an explanatory diagram illustrating a third example of the exterior of an information processing device.

FIG. 4 is a block diagram illustrating an example of a hardware configuration of an information processing device according to an embodiment.

FIG. 5 is a block diagram illustrating an example of a logical function configuration of an image processing device according to an embodiment.

FIG. 6A is a flowchart illustrating a first example of a flow of an action recognition process.

FIG. 6B is a flowchart illustrating a second example of a flow of an action recognition process.

FIG. 6C is a flowchart illustrating a third example of a flow of an action recognition process.

FIG. 7 is an explanatory diagram for explaining a first example of setting priorities according to a user's action state.

FIG. 8 is an explanatory diagram for explaining a second example of setting priorities according to a user's action state.

FIG. 9A is an explanatory diagram for explaining a first technique for adjusting priorities.

FIG. 9B is an explanatory diagram for explaining a second technique for adjusting priorities.

FIG. 10 is a flowchart illustrating an example of the flow of a display control process according to an embodiment.

FIG. 11A is an explanatory diagram illustrating a first example of the display of items.

FIG. 11B is an explanatory diagram illustrating a second example of the display of items.

FIG. 11C is an explanatory diagram illustrating a third example of the display of items.

FIG. 11D is an explanatory diagram illustrating a fourth example of the display of items.

FIG. 11E is an explanatory diagram illustrating a fifth example of the display of items.

FIG. 12 is an explanatory diagram for explaining an example of linking an information processing device and an external device.

FIG. 13 is an explanatory diagram illustrating an example of item display when linking an information processing device and an external device.

FIG. 14 is an explanatory diagram for explaining display control based on recognition of an external device.

DESCRIPTION OF EMBODIMENTS

Hereinafter, preferred embodiments of the present disclosure will be described in detail and with reference to the attached drawings. Note that, in this specification and the appended drawings, structural elements that have substantially the same function and structure are denoted with the same reference numerals, and repeated explanation of these structural elements is omitted.

The description will proceed in the following order.
1. Overview
2. Configuration of device according to embodiment
   2-1. Hardware configuration
   2-2. Functional configuration
   2-3. Process flow
3. Display examples
4. Linking with external device
5. Conclusion <1. Overview>

Technology according to the present disclosure is applicable to information processing devices in various forms, including portable devices such as a tablet personal computer (PC), mobile PC, smartphone, game console, or portable navigation devices (PND), as well as wearable devices such as a head-mounted device (HMD), for example. The screens of these information processing devices may be arranged so as to be continually present in a user's visual field while the user engages in activity.

FIG. 1 is an explanatory diagram illustrating a first example of the exterior of an information processing device to which technology according to the present disclosure may be applied. In the first example, the information processing device 100a is a glasses-style wearable device worn on a user's head. The information processing device 100a is equipped with a pair of screens SCa and SCb, a housing HS, an imaging lens LN, and a touch surface TS. The screens SCa and SCb are see-through or non-see-through screens arranged in front of a user's left eye and right eye, respectively. The housing HS includes a frame that supports the screens SCa and SCb, and what are called temples positioned on the sides of a user's head. Various modules for information processing are stored inside the temples. The imaging lens LN is arranged such that the optical axis is approximately parallel to the user's line of sight, and is used to capture images. The touch surface TS is a surface that detects touches by the user, and is used in order for the information processing device 100a to receive user input.

FIG. 2 is an explanatory diagram illustrating a second example of the exterior of an information processing device to which technology according to the present disclosure may be applied. In the second example, the information processing device 100b is a mobile client carried by a user. The information processing device 100b is equipped with a touch surface TS and a screen SC that are integrally constituted as a touch panel display, as well as buttons BT. In a given usage scenario, the screen SC is held in front by the user, and is continuously present in the user's visual field. An imaging lens of the information processing device 100b may be provided on the back of the screen SC. The touch surface TS and the buttons BT are used in order for the information processing device 100b to receive user input.

FIG. 3 is an explanatory diagram illustrating a third example of the exterior of an information processing device to which technology according to the present disclosure may be applied. In the third example, the information processing device 100c is a navigation device attached to a vehicle VH that a user rides. The information processing device 100c may be a specialized navigation device, or a general-purpose device such as a smartphone with navigation functionality. The information processing device 100c is equipped with a screen SC and buttons BT. The screen SC is continuously present in the user's visual field while the user is riding the vehicle VH. The buttons BT are used in order for the information processing device 100c to receive user input.

These information processing devices are carried by an active user, and provide the user with various information. Various information such as advertising information, social information (such as social networking service (SNS) posts, blog posts, or email), news information, and traffic information may be provided, even while the user is engaged in activity. However, if much information is simultaneously provided to a user, there is a risk that the user will instead overlook highly necessary information. Particularly, it is difficult for a user to check a varied assortment of information one by one in the case of attempting to provide information while the user is engaged in some activity. Accordingly, in the embodiments described in detail in the next section, the provision of information is controlled using priorities that are adaptively set according to user action recognition results, such that the user will reliably notice information inferred to be highly necessary to the user.

<2. Configuration of Device According to Embodiment>

In the following description, when the information processing devices 100a, 100b, and 100c are not being distinguished from each other, these devices will be collectively referred to as the information processing device 100 by omitting the trailing letters in the reference signs.

<2-1. Hardware Configuration>

FIG. 4 is a block diagram illustrating an example of a hardware configuration of an information processing device 100 according to an embodiment. Referring to FIG. 4, the information processing device 100 is equipped with an imaging unit 102, a sensor unit 104, an input unit 106, storage 108, a display 110, a communication unit 112, a bus 116, and a controller 118.

(1) Imaging Unit

The imaging unit 102 is a camera module that captures images. The imaging unit 102 includes a lens LN as illustrated by example in FIG. 1, a CCD, CMOS, or other image sensor, and an imaging circuit. The imaging unit 102 generates a captured image depicting a real space. A series of captured images generated by the imaging unit 102 may constitute video.

(2) Sensor Unit

The sensor unit 104 may include various sensors such as a positioning sensor, an acceleration sensor, and a gyro sensor. The positioning sensor may be, for example, a Global Positioning System (GPS) sensor that receives GPS signals and measures the latitude, longitude, and altitude of the device. Otherwise, the positioning sensor may be a sensor that executes positioning on the basis of the strengths of wireless signals received from wireless access points. The acceleration sensor measures 3-axis acceleration imparted to the information processing device 100. The gyro sensor measures the tilt angle of the information processing device 100. The sensor unit 104 outputs sensor data indicating measurement results output from these sensors to the controller 118.

(3) Input Unit

The input unit 106 is an input interface used in order for a user to operate the information processing device 100 or input information into the information processing device 100. The input unit 106 receives user input via the touch surface TS exemplified in FIG. 1 or the buttons BT exemplified in FIGS. 2 and 3, for example. Instead of (or in addition to) a touch sensor or buttons, the input unit 106 may also include other types of input interfaces, such as switches, dials, a keypad, a keyboard, or a speech input interface. The input unit 106 may additionally include a gaze detection interface that detects the user's gaze direction.

(4) Storage

The storage 108 is realized with a storage medium such as semiconductor memory or a hard disk, and stores programs and data used in processing by the information processing device 100. Data stored by the storage 108 may include captured image data and sensor data, as well as data in a database to be described later, and a mapping table, for example. Note that some of the programs and data described in this specification may also be acquired from an external data source (such as a data server, network storage, or externally attached memory, for example), rather than being stored in the storage 108.

(5) Display

The display 110 is a display module that includes the pair of screens SCa and SCb exemplified in FIG. 1, the screen SC exemplified in FIG. 2, or the screen SC exemplified in FIG. 3, and a display circuit. The display 110 displays on-screen output images generated by a display controller 180 described later.

(6) Communication Unit

The communication unit 112 is a communication interface that mediates communication between the information processing device 100 and another device. The communication unit 112 supports an arbitrary wireless communication protocol or wired communication protocol, and establishes a communication connection with another device.

(7) Bus

The bus 116 connects the imaging unit 102, the sensor unit 104, the input unit 106, the storage 108, the display 110, the communication unit 112, and the controller 118 to each other.

(8) Controller

The controller 118 corresponds to a processor such as a central processing unit (CPU) or a digital signal processor (DSP). The controller 118 causes various functions of the information processing device 100 described later to operate by executing a program stored in the storage 108 or another storage medium.

<2-2. Functional Configuration>

FIG. 5 is a block diagram illustrating an exemplary configuration of logical functions realized by the storage 108 and the controller 118 of the information processing device 100 illustrated in FIG. 4. Referring to FIG. 5, the information processing device 100 is equipped with an environment recognition unit 120, an action recognition unit 130, a user database (DB) 140, an information acquisition unit 150, a priority setting unit 160, an attention determination unit 170, and a display controller 180.

(1) Environment Recognition Unit

The environment recognition unit 120 recognizes the environment of the real space in which a user is active. For example, the environment recognition unit 120 may recognize the current date and time. The environment recognition unit 120 may also recognize an object appearing in a captured image input from the imaging unit 102 by using an established object recognition technology such as pattern matching. The environment recognition unit 120 may also recognize a person appearing in a captured image input from the imaging unit 102 by using an established facial image recognition technology. The environment recognition unit 120 outputs environment recognition results to the action recognition unit 130 and the information acquisition unit 150.

(2) Action Recognition Unit

The action recognition unit 130 recognizes a user's action state. Typically, the action recognition unit 130 executes recognition of a user's action state while a display item is being displayed on-screen on the display 110. As an example, the action recognition unit 130 may recognize action states related to a user's movement speed. Action states related to movement speed may include at least one from among the states "sitting/standing still", "walking/running", and "riding a vehicle", for example. The action recognition unit 130 may also recognize action states related to the transportation being utilized by a user. Action states related to transportation may include at least one from among "riding a train", "riding a car", and "riding a bicycle", for example. For example, Japanese Unexamined Patent Application Publication No. 2006-345269 describes a technique of recognizing the above action states on the basis of sensor data from an acceleration sensor and a gyro sensor. The action recognition unit 130 may recognize a user's action state by using such a sensor-based technique or another established technique. Also, as a simpler technique, the action recognition unit 130 may also prompt a user to explicitly select the current action state via a user interface.

The recognition of action states by the action recognition unit 130 is not limited to the examples discussed above. For example, the action recognition unit 130 may also recognized more detailed action states by additionally using positioning data input from the positioning sensor. For example, the above action state "sitting/standing still" may be further differentiated into the two action states of "working" and "relaxing" by determining, on the basis of positioning data, whether a user is at a specific place such as an office or home. In addition, the above action state "riding a train" may be recognized by determining, on the basis of positioning data, that a user is at a train station or on a train line.

The action recognition unit 130 may also recognize action states related to persons accompanying a user's activity (hereinafter designated companions). The action recognition unit 130 may determine a companion from the results of person recognition by the environment recognition unit 120, for example. Otherwise, the action recognition unit 130 may also determine a companion by querying, via the communication unit 112, a location data server that manages the current locations of multiple users. The action recognition unit 130 may also determine a companion by transmitting, to a nearby device, a request signal requesting identification information such as a user ID or a device ID, receiving a response signal to the request signal, and cross-referencing the received identification information against existing identification information registered in advance. The above action state "sitting/standing still" may be further differentiated into the two action states of "working" and "relaxing" by determining whether a companion is a user's friend or family, or a coworker.

Hereinafter, three examples of action recognition processes which may be executed by the action recognition unit 130 will be described using flowcharts.

FIG. 6A is a flowchart illustrating a first example of a flow of an action recognition process. Referring to FIG. 6A, first, the action recognition unit 130 acquires sensor data generated by the sensor unit 104 (step S30). The sensor data acquired at this point may include positioning data indicating a current user position, as well as acceleration data indicating acceleration imparted to the information processing device 100. The user's current velocity may also be computed from the timewise change in the user location or the integral of the acceleration.

Next, the action recognition unit 130 determines whether or not the user has stopped for a specific period (such as from several seconds to several minutes, for example) (step S31). Herein, "stopped" not only refers to when the user's velocity is exactly zero, but also encompasses situations in which the user's velocity falls below a predetermined first threshold value. In the case where the user has stopped for the specific period, the action recognition unit 130 determines that the user's action state is a "sitting/standing still" state ST1 (step S37).

In the case of determining in step S31 that the user has not stopped, the action recognition unit 130 additionally determines whether the has been moving at a velocity exceeding a predefined second threshold value (which is larger than the above first threshold value, and may be 30 km/hr, for example) for a specific period (step S35). In the case where the user has been moving at a velocity exceeding the second threshold value for the specific period, the action recognition unit 130 determines that the user's action state is a "riding a vehicle" state ST2 (step S38). Otherwise, the action recognition unit 130 determines that the user's action state is a "walking/running" state ST3 (step S39).

FIG. 6B is a flowchart illustrating a second example of a flow of an action recognition process. Referring to FIG. 6B, first, the action recognition unit 130 acquires sensor data generated by the sensor unit 104 (step S30). The sensor data acquired at this point may include positioning data and acceleration data, and a user's current velocity may also be computed.

Next, the action recognition unit 130 determines whether or not the user has stopped for a specific period (step S31). In the case where the user has stopped for the specific period, the action recognition unit 130 additionally determines whether or not the place where the user is located is an office (step S32). Note that location data for an office (or some other workplace) where the user works is registered in the user DB 140 in advance. Then, in the case where the place where the user is located is an office, the action recognition unit 130 determines that the user's action state is a "working" state ST1a (step S37a). Meanwhile, in the case where the place where the user is located is not an office, the action recognition unit 130 determines that the user's action state is a "relaxing" state ST1b (step S37b).

In the case of determining in step S31 that the user has not stopped, the action recognition unit 130 additionally determines whether the has been moving at a velocity exceeding a predefined second threshold value for a specific period (step S35). In the case where the user is moving at a velocity exceeding the second threshold value for the specific period, the action recognition unit 130 additionally determines whether or not the place where the user is located is a train station or on a train line (step S36). Then, in the case where the place where the user is located is a train station or on a train line, the action recognition unit 130 determines that the user's action state is a "riding a train" state ST2a (step S38a). Meanwhile, in the case where the place where the user is located is neither a train station nor on a train line, the action recognition unit 130 determines that the user's action state is a "riding a car" state ST2b (step S38b). Additionally, in the case where the user has not been moving at a velocity exceeding the second threshold value for the specific period, the action recognition unit 130 determines that the user's action state is a "walking/running" state ST3 (step S39).

FIG. 6C is a flowchart illustrating a third example of a flow of an action recognition process. Referring to FIG. 6C, first, the action recognition unit 130 acquires sensor data generated by the sensor unit 104 (step S30). The sensor data acquired at this point may include positioning data and acceleration data, and a user's current velocity may also be computed.

Next, the action recognition unit 130 determines whether or not the user has stopped for a specific period (step S31). In the case where the user has stopped for the specific period, the action recognition unit 130 acquires identification information for a nearby device by transmitting a query to a location data server, or by transmitting to a nearby device a request signal requesting identification information (step S33). Next, the action recognition unit 130 determines whether or not the user is together with a coworker by cross-referencing the identification information from the nearby device with existing identification information registered in the user DB 140 in advance (step S34). In the case where the user is together with a coworker, the action recognition unit 130 determines that the user's action state is a "working" state ST1a (step S37a). Meanwhile, in the case where the place where the user is not together with a coworker (or together with a friend or family member), the action recognition unit 130 determines that the user's action state is a "relaxing" state ST1b (step S37b).

In the case of determining in step S31 that the user has not stopped, the action recognition unit 130 additionally determines whether the has been moving at a velocity exceeding a predefined second threshold value for a specific period (step S35). In the case where the user has been moving at a velocity exceeding the second threshold value for the specific period, the action recognition unit 130 determines that the user's action state is a "riding a vehicle" state ST2 (step S38). Otherwise, the action recognition unit 130 determines that the user's action state is a "walking/running" state ST3 (step S39).

The action recognition unit 130 outputs an identifier for the user's action state recognized in this way to the information acquisition unit 150, the priority setting unit 160, and the display controller 180.

(3) User DB

The user DB 140 is a database that stores data related to users of information processing devices 100. The user DB 140 may also, for example, store location data for a user's office and home, as well as identification information for devices possessed by a user's coworkers, family, and friends in order to aid recognition of a user's action state. The user DB 140 may also store login information for a data server utilized when the information acquisition unit 150 acquires information as discussed later. The user DB 140 may also store preference information expressing a user's preferences. Preference information may be automatically collected from a user's content viewing/playback history or email history, or registered by the user him- or herself via a user interface, for example.

(4) Information Acquisition Unit

The information acquisition unit 150 acquires information to provide to a user. For example, the information acquisition unit 150 accesses a data server via the communication unit 112 and acquires information from the data server. Information acquired by the information acquisition unit 150 may include information in various categories, such as advertising information, social information, news information, and traffic information. The information acquisition unit 150 may also periodically acquire up-to-date information from a data server according to a fixed cycle, or acquire information from the data server in response to a trigger, such as the activation of an information-providing application. The information acquisition unit 150 may also acquire information specific to a locality by using positioning data input from the sensor unit 104. The information acquisition unit 150 may also acquire additional information associated with an object or person appearing in a captured image recognized by the environment recognition unit 120. The additional information may include information such as the name and attributes of the object or person, a related message, or a related advertisement. The information acquisition unit 150 outputs acquired information to the display controller 180.

(5) Priority Setting Unit

The priority setting unit 160 determines priorities for multiple display items according to an action state recognized by the action recognition unit 130. In this specification, display items refer to individual pieces of information to provide to a user via a screen. Each display item is categorized according to the type of information. The priority setting unit 160 may, for example, set the priority of a display item belonging to a category associated with an action state recognized by the action recognition unit 130 higher than the priority of a display item belonging to another category. As an example, news information may be associated with the "working" state ST1a, social information with the "relaxing" state ST1b, and traffic information with the "riding a vehicle" state ST2. Such association patterns may be predefined using a mapping table 165 as exemplified in FIG. 7, for example. Association patterns may also be edited by a user via a user interface. The priority setting unit 160 may also use different association patterns depending on the type of device displaying the display items.

FIG. 7 is an explanatory diagram for explaining a first example of setting priorities according to a user's action state. FIG. 7 illustrates the contents of the mapping table 165 in the first example. Each row of the mapping table expresses a particular category of information items. Each column of the mapping table expresses a particular action state. Note that three types of action states are herein assumed to be potentially recognizable: a "sitting/standing still" state ST1, a "riding a vehicle" state ST2, and a "walking/running" state ST3, like the example in FIG. 6A. In the example in FIG. 7, priority values are numerical values in the range from 1 to 5. A smaller value represents a higher priority. In the case where a user's action state is the state ST1, the priority of advertising information is set to "3", the priorities of social information and new information are set to "1", and the priority of traffic information is set to "5". In the case where a user's action state is the state ST2, the priority of advertising information is set to "5", the priorities of social information and new information are set to "3", and the priority of traffic information is set to "1". In the case where a user's action state is the state ST3, the priority of advertising information is set to "3", the priorities of social information and new information are set to "5", and the priority of traffic information is set to "1".

FIG. 8 is an explanatory diagram for explaining a second example of setting priorities according to a user's action state. FIG. 8 illustrates the contents of the mapping table 165 in the second example. Each row of the mapping table expresses a particular sub-category of information items. Each column of the mapping table expresses a particular action state. Note that five types of action states are herein assumed to be potentially recognizable: a "working" state ST1a, a "relaxing" state ST1b, a "riding a train" state ST2a, a "riding a car" state ST2b, and a "walking/running" state ST3, like the example in FIG. 6B. In the example in FIG. 8, priority values are likewise numerical values in the range from 1 to 5. A smaller value represents a higher priority. In the case where a user's action state is the state ST1a, the priority of music advertising among advertising information is set to "3", the priority of short posts among social information is set to "5", the priority of economic news among news information is set to "1", the priority of train schedule information among traffic information is set to "3", and the priority of navigation information among traffic information is set to "5". In the case where a user's action state is the state ST1b, the priority of music advertising among advertising information is set to "3", the priority of short posts among social information is set to "1", the priority of economic news among news information is set to "3", the priority of train schedule information among traffic information is set to "3", and the priority of navigation information among traffic information is set to "5". In the case where a user's action state is the state ST2a, the priority of music advertising among advertising information is set to "3", the priority of short posts among social information is set to "3", the priority of economic news among news information is set to "3", the priority of train schedule information among traffic information is set to "1", and the priority of navigation information among traffic information is set to "5". In the case where a user's action state is the state ST2b, the priority of music advertising among advertising information is set to "5", the priority of short posts among social information is set to "5", the priority of economic news among news information is set to "3", the priority of train schedule information among traffic information is set to "5", and the priority of navigation information among traffic information is set to "1". In the case where a user's action state is the state ST3, the priority of music advertising among advertising information is set to "5", the priority of short posts among social information is set to "3", the priority of economic news among news information is set to "3", the priority of train schedule information among traffic information is set to "3", and the priority of navigation information among traffic information is set to "3".

The priority setting unit 160 may also adjust priorities to set according to a user's action state depending on a degree of attention for each display item. The degree of attention for each display item may be determined by the attention determination unit 170 discussed later, according to parameters such as a user's preferences, a user's current location, or the number of times that display item as actually been viewed.

FIG. 9A is an explanatory diagram for explaining a first technique for adjusting priorities. FIG. 9A illustrates three display items belonging to a category called "social information", with item IDs of "IT11", "IT12", and "IT13", respectively, as well as two display items belonging to a category called "news information", with item IDs of "IT21" and "IT22", respectively. The base priorities of the display items IT11, IT12, and IT13 are set to "3" according to the mapping table 165 discussed above, for example. The base priorities of the display items IT21 and IT22 are also set to "3".

With the first technique, the priority setting unit 160 adjusts these base priorities (the priorities before adjustment) according to degrees of attention determined on the basis of a user's preferences. A user's preferences may be expressed in a keywords list format, for example, in which keywords are extracted from a history of past content viewed or played back by the user, or from an email history. For example, Japanese Unexamined Patent Application Publication No. 2003-178075 describes technology that extracts a keyword list from a user's email history. In the example in FIG. 9A, preference information 142 in a keyword list format includes two keywords: "car" and "camera". In addition, at least one of these keywords are respectively included in the information content of the display items IT11 and IT21. Consequently, the priority setting unit 160 adjusts the priority values set for the display items IT11 and IT21 to "2" by applying an offset "−1" to the base priorities "3". Instead of (or in addition to) keywords expressing a user's preferences, a local area name, a facility name, or a shop name corresponding to a user's current location may also be used in order to adjust priorities.

FIG. 9B is an explanatory diagram for explaining a second technique for adjusting priorities. FIG. 9B again illustrates three display items IT11, IT12, and IT13 belonging to a category called "social information", as well as two display items IT21 and IT22 belonging to a category called "news information". With the second technique, the priority setting unit 160 adjusts the priorities of these display items according to degrees of attention determined on the basis of a user's gaze direction. For example, the degree of attention for each display item increases the more times the user's gaze is directed at that display item. In the example in FIG. 9B, at a time T1 when the user's gaze is directed at the display item IT12, the priority value of the display item IT12 changes to "2.5" due to applying an offset "−0.5" to the base priority "3" of the display item IT12. Also, at a time T2 when the user's gaze is directed at the display item IT12, the priority value of the display item IT12 changes to "2" due to further applying the offset "−0.5" to the priority of the display item IT12.

(6) Attention Determination Unit

The attention determination unit 170 determines a degree of attention for each display item. For example, the attention determination unit 170 may determine that the degree of attention is high for a display item having information content with a high correlation to preference information which may be acquired from the user DB 140. The attention determination unit 170 may also determine that the degree of attention is high for a display item having information content with a high correlation to a current location indicated by positioning data input from the sensor unit 104. In addition, by detecting a user's gaze direction, the attention determination unit 170 may also determine a higher degree of attention for a display item that the user has actually viewed more times. The length of time the user's gaze was directed at a display item may also be used to determine a degree of attention instead of the number of times the user viewed a display item. The attention determination unit 170 outputs a degree of attention for each display item determined in this way to the priority setting unit 160.

(7) Display Controller

The display controller 180 controls the display of display items used to provide a user with information input from the information acquisition unit 150, according to priorities set by the priority setting unit 160. For example, the display controller 180 may cause the display 110 to highlight on-screen a display item set with comparatively high priority. More specifically, the display controller 180 may arrange a display item set with a higher priority closer to the center of the screen. The display controller 180 may also set a larger on-screen size for a display item set with a higher priority. The display controller 180 may also set a higher brightness, lower transparency, higher contrast, or higher sharpness for a display item set with a higher priority. The display controller 180 may also set the color of a display item set with a priority exceeding a threshold to a specific color. Additionally, in the case where the display 110 supports three-dimensional (3D) display, the display controller 180 may also set a shallow depth for a display item set with a higher priority. The display controller 180 may also display on-screen only display items set with comparatively high priorities.

The display controller 180 may also determine an object or person in a real space to be perceived by a user according to an action state recognized by the action recognition unit 130, and control the display of display items such that the determined object or person is not obscured by the display items. For example, objects or persons to be visually perceived by a user may include traffic signs and pedestrians while the user is driving a car or riding a bicycle. In addition, objects to be perceived by the user may include the screen of an information device while the user is working. The display controller 180 may control at least one of the on-screen position, size, shape, brightness, or transparency of display items such that an object or person to be perceived is not obscured by the display items, for example.

Note that in the case where the screen of the display 110 includes a filter that transmits outside light according to a variable transmittance rate, the display controller 180 is able to allow a user to clearly perceive display items by varying the transmittance rate of the filter. However, if the battery level of the information processing device 100 reaches zero, the transmittance rate of the filter may become unchangeable. Consequently, the display controller 180 may set the filter transmittance to maximum, and maintain the maximum transmittance while the battery level of the information processing device 100 is below a specific threshold value. Thus, it is possible to preemptively avoid situations in which a user's actions are impeded because the transmittance is unchangeable with the screen in a dark state.

In the case where a screen of the display 110 is a non-see-through screen, the display controller 180 generates an output image by superimposing images of display items respectively having determined display attributes onto a captured image, and outputs the generated output image to the display 110. Meanwhile, in the case where a screen of the display 110 is a see-through screen, the display controller 180 outputs individual images of display items respectively having determined display attributes to the display 110. Several examples of item display controlled by the display controller 180 will be additionally described later.

<2-3. Process Flow>

FIG. 10 is a flowchart illustrating an example of the flow of a display control process which may be executed by an information processing device 100 according to an embodiment. The process illustrated in FIG. 10 may be periodically repeated according to a fixed cycle.

Referring to FIG. 10, first, input data such as captured image data, sensor data, and date/time data is collected via the imaging unit 102, the sensor unit 104, and the communication unit 112 (step S110). The environment recognition unit 120 uses the collected input data to recognize the environment of a real space in which a user is active (step S120).

Next, the information acquisition unit 150 acquires information in various categories to provide to the user (step S130). The information acquisition unit 150 may also acquire information specific to a locality, or acquire additional information associated with an object or person appearing in a captured image.

Also, the action recognition unit 130 executes an action recognition process (step S140). The action recognition process executed at this point may be any of the processes described using FIGS. 6A to 6C, or a process like that described in Japanese Unexamined Patent Application Publication No. 2006-345269.

Next, according to an action state recognized by the action recognition unit 130, the priority setting unit 160 sets priorities for display items that respectively express information acquired by the information acquisition unit 150 (step S150). The priority setting unit 160 also adjusts the priorities of display items according to a degree of attention for each display item determined by the attention determination unit 170 (step S160).

Next, the display controller 180 determines display attributes for display items according to the priorities set by the priority setting unit 160 (step S170). The display attributes herein may be factors such as the position, size, shape, brightness, transparency, color, and depth of a display item, for example. Additionally, the display controller 180 causes each of the display items to be displayed on-screen with the determined display attributes (step S180).

<3. Display Examples>

FIGS. 11A to 11E illustrate five examples of item display by an information processing device 100. In these examples, the information processing device 100 is a wearable device exemplified in FIG. 1.

(1) First Example

In the first example in FIG. 11A, a user's action state is a "relaxing" state ST1b. Four display items IT01, IT11, IT23, and IT31 are being displayed on-screen in the information processing device 100. The category of the display IT01 is advertising information. The category of the display IT11 is social information. The category of the display IT23 is news information. The category of the display IT31 is traffic information. In the first example, the display item IT11 belonging to social information associated with the "relaxing" state ST1b is displayed in the center of the screen at the largest size. Consequently, a user relaxing at home is able to easily notice a friend's short post indicated by the display item IT11. Meanwhile, the display item IT31 belonging to traffic information is displayed at the edge of the screen at a smaller size. Consequently, the user is not distracted by the presence of traffic information, which is not very important in the current action state.

(2) Second Example

In the second example in FIG. 11B, a user's action state is a "riding a train" state ST2a. Four display items IT01, IT11, IT23, and IT31 are being displayed on-screen in the information processing device 100. In the second example, the display item IT31 belonging to train schedule information associated with the "riding a train" state ST2a is displayed in the center of the screen with the shallowest depth (or in other words, farthest in front). Consequently, a user riding a train is able to reliably ascertain that a certain railway line has stopped by viewing the display item IT31. Meanwhile, the display item IT01 belonging to music advertising information is displayed with the deepest depth and at a small size. Consequently, the user is not distracted by the presence of music advertising information which is not very important.

(3) Third Example

In the third example in FIG. 11C, a user's action state is a "relaxing" state ST1b. On the screen illustrated in the upper part of FIG. 11C, a display item IT01 is displayed at the edge of the screen and at a small size. The star illustrated in FIG. 11C represents the position of the user's gaze as detected by the input unit 106. The user's gaze is directed at the display item IT01. In this case, the attention determination unit 170 raises the degree of attention for the display item IT01 under the user's gaze. Subsequently, the priority setting unit 160 changes the priority of the display item IT01 to a larger value. As a result, on the screen illustrated in the lower-left part of FIG. 11C, the position of the display item IT01 approaches the center of the screen. Also, as a result of the user's continued gaze directed at the display item IT01, on the screen illustrated in the lower-right part of FIG. 11C, the position of the display item IT01 further approaches the center of the screen, and the size of the display item IT01 is enlarged. By adjusting the priority in this way, a user is able to more clearly view information attracting his or her interest without performing a special operation.

(4) Fourth Example

In the fourth example in FIG. 11D, a user's action state is a "riding a car" state ST2b. Four display items IT01, IT11, IT23, and IT31 are being displayed on-screen in the information processing device 100. Also, a traffic sign TS exists in a real space appearing in the user's visual field. The environment recognition unit 120 recognizes such a traffic sign TS in a captured image. The display controller 180 arranges the display items IT01, IT11, IT23, and IT31 such that the recognized traffic sign TS is not obscured by these display items. By displaying items in this way, it is possible to avoid situations where a user's appropriate actions (safely driving a car, for example) are hindered as a result of providing information on-screen.

(5) Fifth Example

In the fifth example in FIG. 11E, a user's action state is a "walking/running" state ST3. Three display items IT01, IT23, and IT31 are being displayed on-screen in the information processing device 100. Among these display items, the display item IT31, which contains information content correlated with the keyword "car" expressing the user's preferences, is displayed at a larger size than the other display items.

In addition, persons PE1 and PE1 are walking in a real space appearing in the user's visual field. The display item IT01 is arranged on-screen so as to track the movement of these persons PE1 and PE2 in the user's visual field. The position of persons may be recognized by the environment recognition unit 120 using a captured image, or be recognized by transmitting a query to an external data server. These persons PE1 and PE2 are persons participating in the provision of advertising information registered in an advertising information server in advance, for example. A reward may also be paid to the persons PE1 and PE2 by an advertising information service business as a result of the user viewing the display item IT01. Such a system enables the realization of a new type of advertising information service that draws a user's interest. Note that in cases of low-precision position recognition, the display item IT01 may also not be displayed at a position overlapping the persons.

<4. Linking with External Device>

The functionality of the information processing device 100 discussed above may also be realized by the linkage of multiple devices. FIG. 12 illustrates the information processing device 100a exemplified in FIG. 1, and an external device ED. The external device ED is a mobile client such as a smartphone or a mobile PC. The information processing device 100a wirelessly communicates with the external device ED using an arbitrary wireless communication protocol such as wireless local area network (LAN), Bluetooth (registered trademark), or Zigbee. In addition, one or more of the various logical functions of the information processing device 100a illustrated in FIG. 5 may be executed in the external device ED.

FIG. 13 is an explanatory diagram illustrating an example of item display when linking an information processing device and an external device. Referring to FIG. 13, a display item IT41 is displayed on-screen in the information processing device 100a. The display item IT41 is an item that expresses additional information (such as a name and attributes of a person PE3, for example) associated with the person PE3 appearing in a captured image. The person PE3 is recognized by the environment recognition unit 120. The additional information may be acquired by the information acquisition unit 150 from a data server or a database inside the external device ED. Typically, person recognition is a process that demands comparatively high processor performance, and may include processes such as cross-referencing facial images. A database of additional information may occupy a comparatively large proportion of memory resources. Consequently, by implementing the person recognition process or the database of additional information on the external device ED and linking the information processing device 100a with the external device ED, it becomes possible to realize the information processing device 100a as a low-cost, lightweight, and compact device. In addition, a user is able to view the display item IT41 on a head-mounted display rather than a screen of the external device ED. Consequently, in a situation where a user is facing a person, the user is able to ascertain information related to that person, without making that person uncomfortable due to the user shifting his or her gaze to a screen on the external device ED. Note that processes other than person recognition (such as object recognition, text recognition, action recognition, and priority setting, for example) may also be implemented on the external device ED.

FIG. 14 is an explanatory diagram for explaining display control based on recognition of an external device. In the example in FIG. 14, a display item IT41 is likewise displayed on-screen in the information processing device 100a. The display item IT41 is an item that expresses additional information associated with a person PE3. Also, an external device ED exists in a real space appearing in the user's visual field. The environment recognition unit 120 recognizes such an external device ED in a captured image. The display controller 180 arranges the display item IT41 such that the recognized external device ED is not obscured by the display item IT41. In FIG. 14, the display item IT41 has moved upward compared to FIG. 13. Consequently, in the case where a user is attempting to look at a screen on an external device ED, it is possible to avoid a situation in which that action is hindered by the display of an item.

<5. Conclusion>

The foregoing thus describes embodiments of technology according to the present disclosure in detail using FIGS. 1 to 14. According to the foregoing embodiment, priorities are set for multiple display items according to a user's action state while the display items are being displayed on-screen, and the display of display items is controlled according to the set priorities. Consequently, a user is able to reliably notice information matched to the user's own actions without individually checking a varied assortment of information displayed on-screen.

According to an embodiment, a user's action state may include states related to the user's movement velocity. Consequently, it is possible to provide the user with information in a suitable format according to various user action states, such as a state in which the user is riding a vehicle, a state of walking, a state of running, a state of standing still, and a state of sitting.

Also, according to an embodiment, a user's action state includes states related to transportation being utilized by the user. Consequently, it is possible to provide a user with relevant information in a safer format under conditions where providing information may affect safety, such as a state in which the user is driving a car or riding a bicycle, for example.

Also, according to an embodiment, a user's action state includes states related to a person accompanying a user's activity. Consequently, it is possible to prioritize the provision of more desirable information to the user after suitably determining what kind of information, such as formal information and private information, for example, is desirable for the user at that time.

Also, according to an embodiment, the priority of a display item may be adjusted on the basis of parameters such as the user's preferences, the user's current location, or the user's gaze direction. Consequently, it is possible to prioritize the provision of user-desired information to the user, even among information belonging to a shared category, for example.

Also, according to an embodiment, a display item is displayed on a screen arranged so as to be continually present in a user's visual field while the user engages in activity. In this case, displaying a varied assortment of information on-screen may divert the user's attention and hinder the user's activity, while also increasing the risk of the user overlooking highly necessary information. However, according to technology in accordance with the present disclosure, information matched to the user's activity is relatively highlighted or displayed alone, thus effectively reducing the risk of the user overlooking highly necessary information without greatly hindering the user's activity.

Note that the series of processes conducted by each device described in this specification may be realized in any of software, hardware, and a combination of software and hardware. Programs constituting software are stored in advance in a non-transitory medium provided internally or externally to each device, for example. Each program is then loaded into random access memory (RAM) at runtime and executed by a processor such as a CPU, for example.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An apparatus including:
a user action state obtaining circuit configured to obtain an action state of a user; and
a display control circuit configured to control a display to modify display information based on the action state.

(2) The apparatus according to (1), wherein the display control circuit modifies attributes of the display information based on the action state.

(3) The apparatus according to (2), wherein the display circuit modifies at least one of a font size and location of the display information based on the action state.

(4) The apparatus according to (1) to (3), further comprising:
a priority setting circuit configured to set a priority of at least one category of information based on the action state.

(5) The apparatus according to (4), wherein the priority setting circuit sets the priority of a plurality of categories of information based on the action state.

(6) The apparatus according to (5), wherein the priority setting circuit sets the priority of the plurality of categories of information including advertising information, social information, information, and traffic information.

(7) The apparatus according to (1) to (6), wherein the user action state obtaining circuit obtains the action state of the user as one of working, relaxing, riding a train, riding a car, riding a bicycle, walking, and running.

(8) The apparatus according to (7), wherein the user action state obtaining circuit determines the action state of the user based on location data.

(9) The apparatus according to (7), wherein the user action state obtaining circuit determines the action state of the user based on data from an acceleration sensor and a gyro sensor.

(10) The apparatus according to (4), wherein the priority setting circuit changes the priority of at least one category of information when the action state changes.

(11) The apparatus according to (4), further comprising:
an attention determining circuit configured to determine a degree of attention the user pays to information,
wherein the priority setting circuit is configured to set the priority of the information based on the degree of attention.

(12) The apparatus according to (4), wherein the priority setting circuit is configured to set the priority of the at least one category of information based on a number of times information in the at least one category of information is viewed by the user.

(13) The apparatus according to (4), wherein the priority setting circuit is configured to set the priority of the at least one category of information based on a location of the user.

(14) The apparatus according to (1) to (13), wherein the display control circuit is configured to control the display to display other information received from an external source.

(15) The apparatus according to (14), wherein the display control circuit is configured to control the display to display the other information including advertising information.

(16) The apparatus according to (1) to (15), further comprising:
an eyeglass frame onto which is mounted the display control circuit and the user action state obtaining circuit;
a display mounted in the eyeglass frame and configured to display images generated by the display control circuit;
an imaging device mounted on the eyeglass frame and configured to generate images; and
an object recognition circuit configured to recognize objects in the images generated by the imaging device.

(17) The apparatus according to (16), wherein the display control circuit modifies display of the information such that the information does not overlap the objects in the images.

(18) The apparatus according to (16), wherein the display control circuit modifies display of the information such that the information is associated with one of the objects in the images.

(19) A method including:
obtaining an action state of a user; and
controlling a display, using a processor, to modify display information based on the action state.

(20) A non-transitory computer readable medium encoded with computer readable instructions that, when performed by a processor, cause the processor to perform the method according to (19).

Additionally, the present technology may also be configured as below.

(1)
An information processing device including:
a recognition unit that recognizes an action state of a user while a display item is being displayed on a screen;
a setting unit that sets priorities for a plurality of display items according to the action state recognized by the recognition unit; and
a display controller that controls display of the display items according to the priorities set by the setting unit.

(2)
The information processing device according to (1), wherein
the action state includes a state related to movement velocity of the user.

(3)
The information processing device according to (1) or (2), wherein
the action state includes a state related to transportation being utilized by the user.

(4)
The information processing device according to any one of (1) to (3), wherein
the action state includes a state related to a person accompanying activity of the user.

(5)
The information processing device according to any one of (1) to (4), further including:
a determination unit that determines a degree of attention for each display item,
wherein the setting unit adjusts the priorities of the plurality of display items according to the degree of attention determined by the determination unit.

(6)
The information processing device according to (5), wherein
the determination unit determines the degree of attention for each display item on the basis of a preference of the user.

(7)
The information processing device according to (5), wherein
the determination unit determines the degree of attention for each display item on the basis of a current location of the user.

(8)
The information processing device according to (5), wherein
the determination unit determines the degree of attention for each display item by detecting a gaze direction of the user.

(9)
The information processing device according to any one of (1) to (8),
wherein each of the plurality of display items is categorized according to information type, and
wherein the setting unit sets a priority of a display item belonging to a category associated with the action state recognized by the recognition unit higher than a priority of a display item belonging to another category.

(10)
The information processing device according to any one of (1) to (9), wherein
the display controller highlights the display items set with the priorities, the priorities being relatively high.

(11)
The information processing device according to any one of (1) to (9), wherein the display controller displays only the display items set with the priorities on the screen, the priorities being relatively high.

(12) The information processing device according to any one of (1) to (11), further including:
a display that includes the screen arranged to continually enter a visual field of the user while the user is engaged in activity.

(13) The information processing device according to (12), wherein
the display is a device worn by the user.

(14) The information processing device according to any one of (1) to (13), further including:
an imaging unit that captures a real space,
wherein the display controller determines an object or person in the real space to be visually perceived by the user according to the action state recognized by the recognition unit, and controls display of the display items in a manner that the determined object or person is not obscured by a display item.

(15) The information processing device according to (14), wherein
the display controller controls at least one of a position, a size, a shape, brightness, or transparency of each display item in a manner that the determined object or person is not obscured by the display item.

(16) The information processing device according to any one of (1) to (15),
wherein at least one of the plurality of display items is an item expressing additional information associated with an object or person appearing in a captured image, and
wherein the information processing device further includes an acquisition unit that acquires the additional information from an external device.

(17) The information processing device according to (16), further including:
a display, worn by the user, that includes the screen arranged to enter a visual field of the user;
wherein the external device is a mobile client that communicates with the information processing device.

(18) The information processing device according to (16),
wherein the additional information is advertising information, and
wherein the external device is a data server that includes data associated with the person who participates in provision of the advertising information.

(19) A display control method executed by a controller of an information processing device, including:
recognizing an action state of a user while a display item is being displayed on a screen;
setting priorities for a plurality of display items according to the recognized action state; and
controlling display of the display items according to the set priorities.

(20) A program for causing a computer that controls an information processing device to function as:
a recognition unit that recognizes an action state of a user while a display item is being displayed on a screen;
a setting unit that sets priorities for a plurality of display items according to the action state recognized by the recognition unit; and
a display controller that controls display of the display items according to the priorities set by the setting unit.

REFERENCE SIGNS LIST 100 (100a, 100b, 100c) information processing device
120 environment recognition unit
130 action recognition unit
150 information acquisition unit
160 priority setting unit
170 attention determination unit
180 display controller

The invention claimed is:

1. An apparatus, comprising:
at least one processor configured to:
control a display device to display a first category item to indicate first information and a second category item to indicate second information,
wherein a first category of the first category item is different from a second category of the second category item,
wherein the first category item includes a first item associated with a public transportation and a second item associated with a car;
determine, based on a movement speed of a user, whether an action state of the user is one of a first action state or a second action state,
wherein the movement speed of the user in the first action state is higher than the movement speed of the user in the second action state,
wherein the first action state includes at least one of a riding-a-public-transportation action state or a riding-a-car action state,
wherein the second action state includes at least one of a walking action state or a running action state;
determine, based on a location of the user and the determination that the action state of the user is the first action state, whether the first action state is the riding-a-public-transportation action state or the riding-a-car action state;
control the display device to increase viewability of the second item, based on the determination that the first action state is the riding-a-car action state;
control the display device to increase viewability of the first item, based on the determination that the first action state is the riding-a-public-transportation action state; and
control the display device to increase the viewability of the second category item, based on the determination that the action state is the second action state.

2. The apparatus according to claim 1, wherein the at least one processor is further configured to control the display device to modify the viewability of the first category item and the viewability of the second category item based on modification of at least one of a font size or a location of each of the first category item and the second category item.

3. The apparatus according to claim 1, wherein the at least one processor is further configured to:
set a first priority for the first category item and a second priority for the second category item, wherein the first priority is different from the second priority, and control the display device to modify the viewability of the first category item and the viewability of the second category item, based on the first priority and the second priority.

4. The apparatus according to claim 1, wherein the second category item includes at least one of advertising information, social information, or news information.

5. The apparatus according to claim 1, wherein the at least one processor is further configured to determine, based on motion data from at least one of an acceleration sensor or a gyro sensor, that the action state of the user is one of the first action state or the second action state.

6. The apparatus according to claim 3, wherein the at least one processor is further configured to:
    obtain gaze information of the user from a gaze detection interface; and
    set the first priority and the second priority based on the gaze information.

7. The apparatus according to claim 6, wherein the at least one processor is further configured to:
    determine, based on the gaze information, a number of times that the user viewed the first category item and a number of times that the user viewed the second category item; and
    set the first priority and the second priority, based on the number of times that the user viewed the first category item and the number of times that the user viewed the second category item.

8. The apparatus according to claim 3, wherein the at least one processor is further configured to set the first priority of the first category item and the second priority of the second category item based on a location of the user.

9. The apparatus according to claim 1, wherein the at least one processor is further configured to receive at least one of the first category item or the second category item from an external source.

10. The apparatus according to claim 1, wherein one of the first category item or the second category item includes advertising information.

11. The apparatus according to claim 1, further comprising:
    a frame onto which the at least one processor is mounted, wherein the display device is mounted on the frame; and
    an imaging device, mounted on the frame, configured to generate images,
        wherein the at least one processor is further configured to recognize at least one object in the images generated by the imaging device.

12. The apparatus according to claim 11, wherein the at least one processor is further configured to control the display device to display each of the first category item and the second category item at a place in the display device based on a lack of recognition of the at least one object.

13. The apparatus according to claim 11, wherein the at least one processor is further configured to control the display device to modify at least one of the first category item or the second category item associated with the recognized at least one object.

14. The apparatus according to claim 1,
    wherein the at least one processor is further configured to control the display device to change the viewability of the first category item and the second category item based on a change in a parameter of at least one of the first category item or the second category item, and
    wherein the changed parameter of the at least one of the first category item or the second category item includes at least one of a transparency parameter, a color parameter, or a depth parameter.

15. The apparatus according to claim 1, wherein the at least one processor is further configured to control the display device to modify at least one of the first category item or the second category item to indicate news information associated with an object that is viewed by the user.

16. The apparatus according to claim 1, wherein
    the at least one processor is further configured to control the display device to display the first category item and the second category item over a real space view.

17. The apparatus according to claim 16, wherein
    the apparatus is a head mounted display.

18. The apparatus according to claim 17,
    wherein the display device includes a see-through screen, and a filter configured to transmit outside light according to a variable transmittance rate, and
    wherein the at least one processor is further configured to:
        set the variable transmittance rate to maximum, and
        maintain the maximum variable transmittance while a battery level of the apparatus is below a specific threshold value.

19. The apparatus according to claim 1,
    wherein the public transportation is a train, and
    wherein the at least one processor is configured to:
        determine whether the location of the user is a train station or a train line, and
        control the display device to increase the viewability of the first item, based on the determination that the first action state is the riding-a-public-transportation action state and the location of the user is one of the train station or the train line.

20. A display control method, comprising:
    acquiring speed information of a display apparatus from a first sensor of the display apparatus,
    acquiring location information of the display apparatus from a second sensor of the display apparatus,
    determining, based on the speed information and the location information, whether an action state of a user of the display apparatus is a riding-a-car action state or a riding-a-public-transportation action state,
    controlling a display device of the display apparatus to increase viewability of a first item related to a car, based on the determination that the action state is the riding-a-car action state;
    controlling the display device to increase viewability of a second item related to a public transportation, based on the determination that the action state is the riding-a-public-transportation action state; and
    controlling the display device to increase viewability of a third item different from the first item and the second item, based on the determination that the action state is neither the riding-a-car action state nor the riding-a-public-transportation action state.

21. A non-transitory computer-readable medium having stored thereon computer-readable instructions, which when executed by a computer, cause the computer to execute operations, the operations comprising:
    acquiring speed information of a display apparatus from a first sensor of the display apparatus,
    acquiring location information of the display apparatus from a second sensor of the display apparatus,
    determining, based on the speed information and the location information, whether an action state of a user of the display apparatus is a riding-a-car action state or a riding-a-public-transportation action state, controlling a display device of the display apparatus to increase viewability of a first item related to a car, based on the determination that the action state is the riding-a-car action state;

controlling the display device to increase viewability of a second item related to a public transportation, based on the determination that the action state is the riding-a-public-transportation action state; and controlling the display device to increase viewability of a third item different from the first item and the second item, based on the determination that the action state is neither the riding-a-car action state nor the riding-a-public-transportation action state.

* * * * *